United States Patent
Wolk et al.

(10) Patent No.: US 12,504,567 B2
(45) Date of Patent: Dec. 23, 2025

(54) STRUCTURED FILM AND OPTICAL ARTICLE INCLUDING STRUCTURED FILM

(71) Applicant: 3M INNOVATIVE PROPERTIES COMPANY, St. Paul, MN (US)

(72) Inventors: Martin B. Wolk, Woodbury, MN (US); Robert L. Brott, Woodbury, MN (US); Kevin W. Gotrik, Hudson, WI (US); Christopher S. Lyons, St. Paul, MN (US); Caleb T. Nelson, McKinney, TX (US); Vadim Savvateev, St. Paul, MN (US); James M. Nelson, Lino Lakes, MN (US); Craig R. Schardt, Woodbury, MN (US); Jeffrey L. Solomon, Centerville, MN (US); Karl K. Stensvad, Eagan, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 373 days.

(21) Appl. No.: 18/255,736

(22) PCT Filed: Dec. 15, 2021

(86) PCT No.: PCT/IB2021/061802
§ 371 (c)(1),
(2) Date: Jun. 2, 2023

(87) PCT Pub. No.: WO2022/130260
PCT Pub. Date: Jun. 23, 2022

(65) Prior Publication Data
US 2024/0004110 A1   Jan. 4, 2024

Related U.S. Application Data

(60) Provisional application No. 63/127,555, filed on Dec. 18, 2020.

(51) Int. Cl.
*G02B 5/18* (2006.01)

(52) U.S. Cl.
CPC ......... *G02B 5/1857* (2013.01); *G02B 5/1809* (2013.01)

(58) Field of Classification Search
CPC ........ G02B 5/008; G02B 1/002; G02B 1/007; G02B 26/06; G02B 1/005; G02B 5/1809;
(Continued)

(56) References Cited

U.S. PATENT DOCUMENTS

| 5,175,030 A | 12/1992 | Lu et al. |
| 5,183,597 A | 2/1993 | Lu |

(Continued)

FOREIGN PATENT DOCUMENTS

| CN | 1996120 A | 7/2007 |
| WO | 2009002637 A2 | 12/2008 |

(Continued)

OTHER PUBLICATIONS

Chiniwalla, "Multilayer Planarization of Polymer Dielectics", IEEE Transaction on Advanced Packaging, Feb. 2001, vol. 24, No. 1, pp. 41-53.

(Continued)

*Primary Examiner* — Jonathan Y Jung
(74) *Attorney, Agent, or Firm* — Clifton F. Richardson

(57) ABSTRACT

An optical article includes a waveguide and a structured film. The structured film includes a polymeric substrate, an etch stop layer disposed on the polymeric substrate, a structured layer including a plurality of engineered structures disposed on a side of the etch stop layer opposite the polymeric substrate, a planarizing backfill layer disposed over the plurality of engineered structures to define a substantially planar major surface of the planarizing backfill layer having a surface roughness Ra, and an adhesive layer (Continued)

disposed on the substantially planar surface of the planarizing backfill layer and bonding the structured film to the waveguide. A difference in index of refraction of the planarizing backfill layer and the structured layer is at least 0.25 for at least a first wavelength W1 in a range of 400 nm to 2500 nm. The adhesive layer has an average thickness ta where Ra<ta<¼W1.

15 Claims, 10 Drawing Sheets

(58) Field of Classification Search
CPC ... G02B 5/1857; G02F 1/292; G02F 2202/30; B29C 37/0025; B32B 37/24; B32B 38/06
See application file for complete search history.

(56) References Cited

U.S. PATENT DOCUMENTS

| | | |
|---|---|---|
| 5,440,446 A | 8/1995 | Shaw et al. |
| 5,639,305 A | 6/1997 | Brown et al. |
| 5,811,183 A | 9/1998 | Shaw et al. |
| 6,033,728 A | 3/2000 | Kikuchi et al. |
| 6,045,864 A | 4/2000 | Lyons et al. |
| 6,322,236 B1 | 11/2001 | Campbell et al. |
| 6,623,355 B2 | 9/2003 | McClain et al. |
| 6,682,950 B2 | 1/2004 | Yang et al. |
| 6,696,157 B1 | 2/2004 | David et al. |
| 6,709,883 B2 | 3/2004 | Yang et al. |
| 6,858,537 B2 | 2/2005 | Brewer |
| 7,018,713 B2 | 3/2006 | Padiyath et al. |
| 7,053,419 B1 | 5/2006 | Camras et al. |
| 7,122,482 B2 | 10/2006 | Xu et al. |
| 7,328,638 B2 | 2/2008 | Gardiner et al. |
| 7,350,442 B2 | 4/2008 | Ehnes et al. |
| 7,521,727 B2 | 4/2009 | Khanarian et al. |
| 7,591,903 B2 | 9/2009 | Maier et al. |
| 7,718,264 B2 | 5/2010 | Klun et al. |
| 8,034,452 B2 | 10/2011 | Padiyath et al. |
| 8,460,568 B2 | 6/2013 | David et al. |
| 8,658,248 B2 | 2/2014 | Anderson et al. |
| 8,664,323 B2 | 3/2014 | Iyer et al. |
| 8,808,811 B2 | 8/2014 | Kolb et al. |
| 9,415,561 B2 | 8/2016 | Lindquist et al. |
| 9,718,961 B2 | 8/2017 | Corveleyn et al. |
| 9,790,396 B2 | 10/2017 | Klun et al. |
| 10,436,946 B2 | 10/2019 | Free et al. |
| 10,670,862 B2 | 6/2020 | Vallius et al. |
| 2007/0065636 A1 | 3/2007 | Merrill et al. |
| 2010/0316852 A1 | 12/2010 | Condo et al. |
| 2011/0188118 A1 | 8/2011 | Kley et al. |
| 2011/0296726 A1 | 12/2011 | Rinko |
| 2012/0064296 A1 | 3/2012 | Walker, Jr. et al. |
| 2012/0161600 A1* | 6/2012 | Norris ............... B81C 99/009 156/247 |
| 2013/0229378 A1 | 9/2013 | Iyer et al. |
| 2014/0193612 A1 | 7/2014 | Yu et al. |
| 2015/0140720 A1* | 5/2015 | Collins ............... H10F 71/121 438/65 |
| 2015/0214405 A1 | 7/2015 | Nachtigal et al. |
| 2016/0033784 A1 | 2/2016 | Levola et al. |
| 2016/0234485 A1 | 8/2016 | Robbins et al. |
| 2016/0325536 A1* | 11/2016 | Wolk ............... B32B 37/025 |
| 2017/0131460 A1 | 5/2017 | Lin et al. |
| 2017/0365818 A1 | 12/2017 | Wolk et al. |
| 2019/0033683 A1 | 1/2019 | Ahmed et al. |
| 2019/0227316 A1 | 7/2019 | Lee et al. |
| 2020/0033530 A1 | 1/2020 | Colburn et al. |
| 2020/0213579 A1 | 7/2020 | Mohanty |
| 2020/0285145 A1* | 9/2020 | Watkins ............ C23C 18/1216 |
| 2020/0301062 A1 | 9/2020 | Young et al. |
| 2021/0157041 A1* | 5/2021 | Olkkonen .......... G02B 27/0172 |
| 2021/0347135 A1* | 11/2021 | van Lengerich ............ B29D 11/00865 |

FOREIGN PATENT DOCUMENTS

| | | |
|---|---|---|
| WO | 2017172531 A1 | 10/2017 |
| WO | 2018220264 A1 | 12/2018 |
| WO | 2019195186 A1 | 10/2019 |
| WO | 2020095258 A1 | 5/2020 |
| WO | 2020097319 A1 | 5/2020 |
| WO | 2022130255 A1 | 6/2022 |

OTHER PUBLICATIONS

International Search Report for PCT International Application No. PCT/IB2021/061802, mailed on Mar. 15, 2022, 3 pages.

Kothari, "Direct Patterning of Robust One-Dimensional, Two-Dimensional, and Three-Dimensional Crystalline Metal Oxide Nanostructures Using Imprint Lithography and Nanoparticle Dispersion Inks" Chemistry of Materials, App 2017, vol. 29, No. 9, pp. 3908-3918.

Kress, "Optical waveguide combiners for AR headsets: features and limitations", Proceedings of SPIE 11062, Digital Optical Technologies, Jul. 2019, vol. 11062, pp. 110620J (1-26).

Liu, "Diamond turning of high-precision roll-to-roll imprinting molds for fabricating subwavelength gratings", Optical Engineering, Jun. 2016, vol. 55, No. 6, pp. 064105(1-7).

Liu, "Taming the Blackbody with Infrared Metamaterials as Selective Thermal Emitters", Physical Review Letters, Jul. 2011, vol. 107, No. 4, pp. 045901(1-4).

Matsuno, "Perfect infrared absorber and emitter based on a large-area metasurface", Optical Materials Express, Feb. 2017, vol. 7, No. 2, pp. 618-626.

* cited by examiner

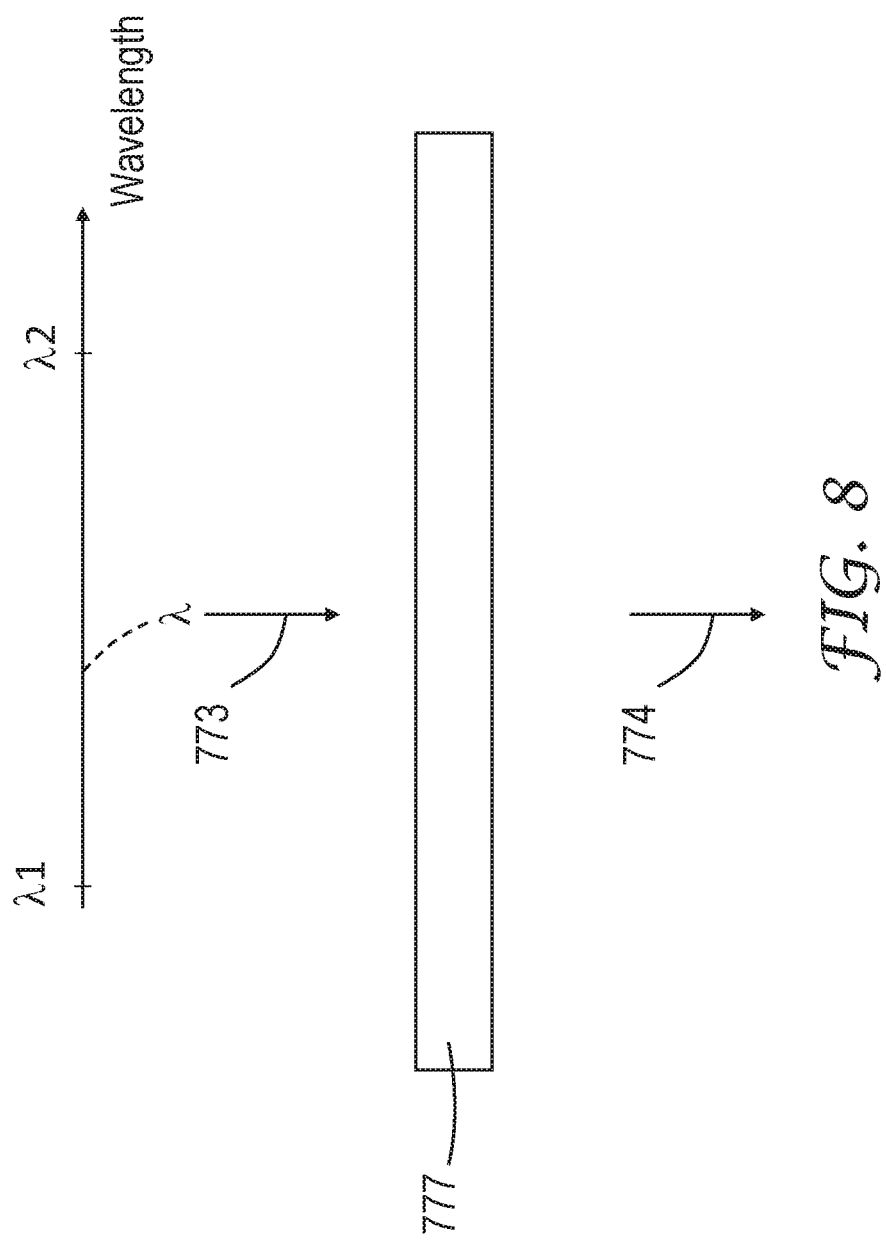

STRUCTURED FILM AND OPTICAL ARTICLE INCLUDING STRUCTURED FILM

CROSS REFERENCE TO RELATED APPLICATIONS

This application is a national stage filing under 35 U.S.C. 371 of PCT/IB2021/061802, filed Dec. 15, 2021, which claims the benefit of U.S. Application No. 63/127,555, filed Dec. 18, 2020, the disclosures of which are incorporated by reference in their entirety herein.

BACKGROUND

Structured articles, such as nanostructured articles, are useful for a variety of applications, including optical applications such as optical metasurface applications.

SUMMARY

The present description relates generally to structured films and to optical articles that include a structured film.

In some aspects of the present description, an optical article is provided. The optical article includes a waveguide and a structured film. The structured film includes a polymeric substrate, an etch stop layer disposed on the polymeric substrate, a structured layer including a plurality of engineered structures disposed on a side of the etch stop layer opposite the polymeric substrate, a planarizing backfill layer disposed over the plurality of engineered structures to define a substantially planar major surface of the planarizing backfill layer having a surface roughness Ra, and an adhesive layer disposed on the substantially planar major surface of the planarizing backfill layer and bonding the structured film to the waveguide. A difference in index of refraction of the planarizing backfill layer and the structured layer is at least 0.25 for at least a first wavelength W1 in a range of 400 nm to 2500 nm. The adhesive layer has an average thickness ta where Ra<ta<¼ W1.

In some aspects of the present description, a structured film is provided. The structured film includes a polymeric substrate, an etch stop layer disposed on the polymeric substrate, a structured layer including a plurality of engineered structures disposed on a side of the etch stop layer opposite the polymeric substrate, a planarizing backfill layer disposed over the plurality of engineered structures to define a substantially planar major surface of the planarizing backfill layer having a surface roughness Ra, and an adhesive layer disposed on the substantially planar major surface of the planarizing backfill layer. The engineered structures can be slanted relative to the etch stop layer. A difference in index of refraction of the planarizing backfill layer and the structured layer is at least 0.25 for at least a first wavelength W1 in a range of 400 nm to 2500 nm. The adhesive layer has an average thickness ta where Ra<ta<¼ W1.

In some aspects of the present description, an optical article including a waveguide and a structured film disposed on a major surface of the waveguide is provided. The structured film includes an etch stop layer, a structured layer disposed on the etch stop layer and including a plurality of engineered structures, a planarizing backfill layer disposed over the plurality of engineered structures to define a substantially unstructured major surface of the planarizing backfill layer having a surface roughness Ra, and an adhesive layer disposed on the substantially unstructured major surface of the planarizing backfill layer. A difference in index of refraction of the planarizing backfill layer and the structured layer being at least 0.25 for at least a first wavelength W1 in a range of 400 nm to 2500 nm. The adhesive layer bonds the structured film to the major surface of the waveguide and has an average thickness ta where Ra<ta<¼ W1. The engineered structures can be slanted relative to the etch stop layer.

In some aspects of the present description, a structured film is provided. The structured film includes a polymeric substrate, an etch stop layer, a dynamic separating layer disposed between the polymeric substrate and the etch stop layer, a structured layer comprising a plurality of engineered structures disposed on a side of the etch stop layer opposite the dynamic separating layer, a planarizing backfill layer disposed over the plurality of engineered structures to define a substantially planar major surface of the planarizing backfill layer having a surface roughness Ra, and an adhesive layer disposed on the substantially planar major surface of the planarizing backfill layer. A difference in index of refraction of the planarizing backfill layer and the structured layer is at least 0.25 for at least a first wavelength W1 in a range of 400 nm to 2500 nm. The adhesive layer has an average thickness ta where Ra<ta<¼ W1. The dynamic separating layer is adapted to facilitate separation of the polymeric substrate and the etch stop layer upon activation.

These and other aspects will be apparent from the following detailed description. In no event, however, should this brief summary be construed to limit the claimable subject matter.

BRIEF DESCRIPTION OF THE DRAWINGS

FIG. 8 is a schematic cross-sectional view illustrating light incident on one or more layers, according to some embodiments.

DETAILED DESCRIPTION

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

Nanostructured articles can be formed by patterning functional materials. Patterning of functional materials can be carried out by depositing a uniform layer of the functional material on a substrate (e.g., a waveguide) and then using a lithographic patterning step to create the pattern in the material. Other methods of forming nanostructured articles are described in International Pat. Appl. Pub. Nos. WO 2020/095258 (Van Lengerich et al.) and WO 2020/097319 (Wolk et al.), for example.

According to some embodiments of the present description, a structured film is provided that can be used to apply structures (e.g., nanostructures) onto a substrate without the series of steps used in a typical lithographic patterning process. The structured films may be substantially larger than the semiconductor wafer formats used in traditional nanoimprint lithography (NIL) batch processes or display glass substrates typically used in large format NIL or roll to plate NIL, for example. In some embodiments, the structured film has a largest dimension of greater than 100 mm, 200 mm, 300 mm, 450 mm, or 600 nm, for example. In some embodiments, the structured film has a largest dimension of greater than 4 m, or greater than 5 m, or greater than 10 m, or greater than 50 m, or greater than 100 m, for example. The structured films may be made in a continuous roll-to-roll process. In some embodiments, a roll of the structured film is provided. In some embodiments, the roll is converted to sheet form.

The structured film may include a low index layer separating structured layers from a polymeric substrate, or a polymeric substrate included in the structured film may be removed after the structured film is applied to a waveguide, for example. The structured films may be designed to create the equivalent of surface relief gratings (SRGs) or optical metasurfaces on a waveguide, for example, without the series of lithographic patterning steps utilized in a typical SRG patterning process.

Figure 1:
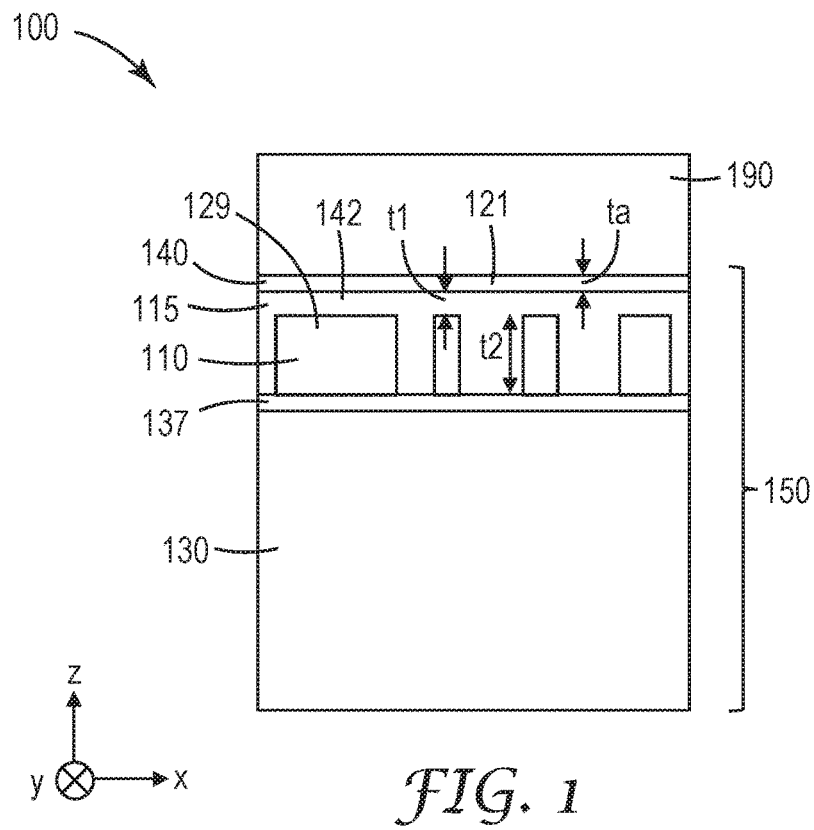
FIGS. 1-3 are schematic cross-sectional views of optical articles that include a waveguide and a structured film including a polymeric substrate, according to some embodiments.
Figure 2:
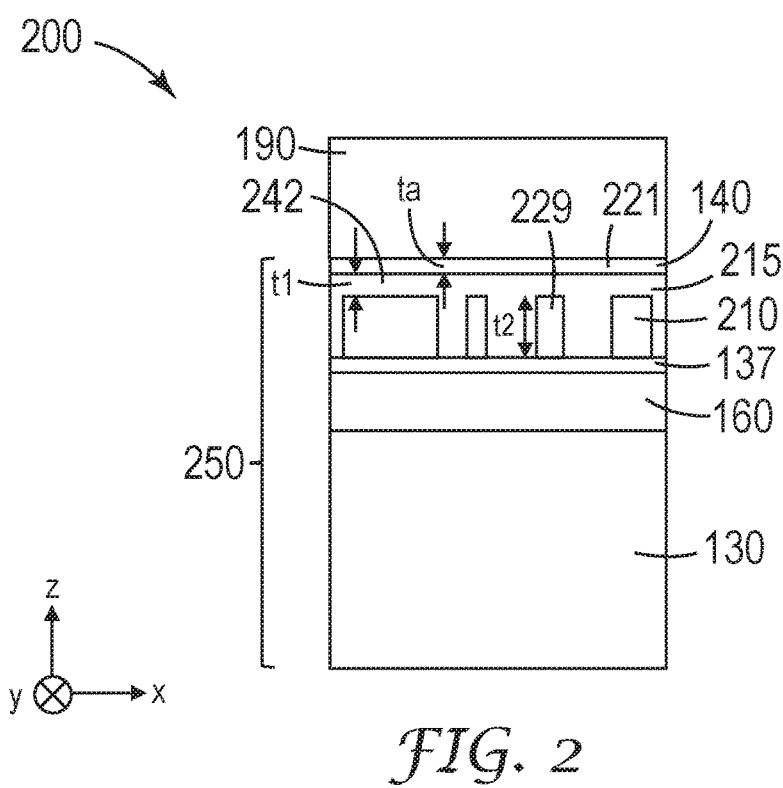
Figure 3:
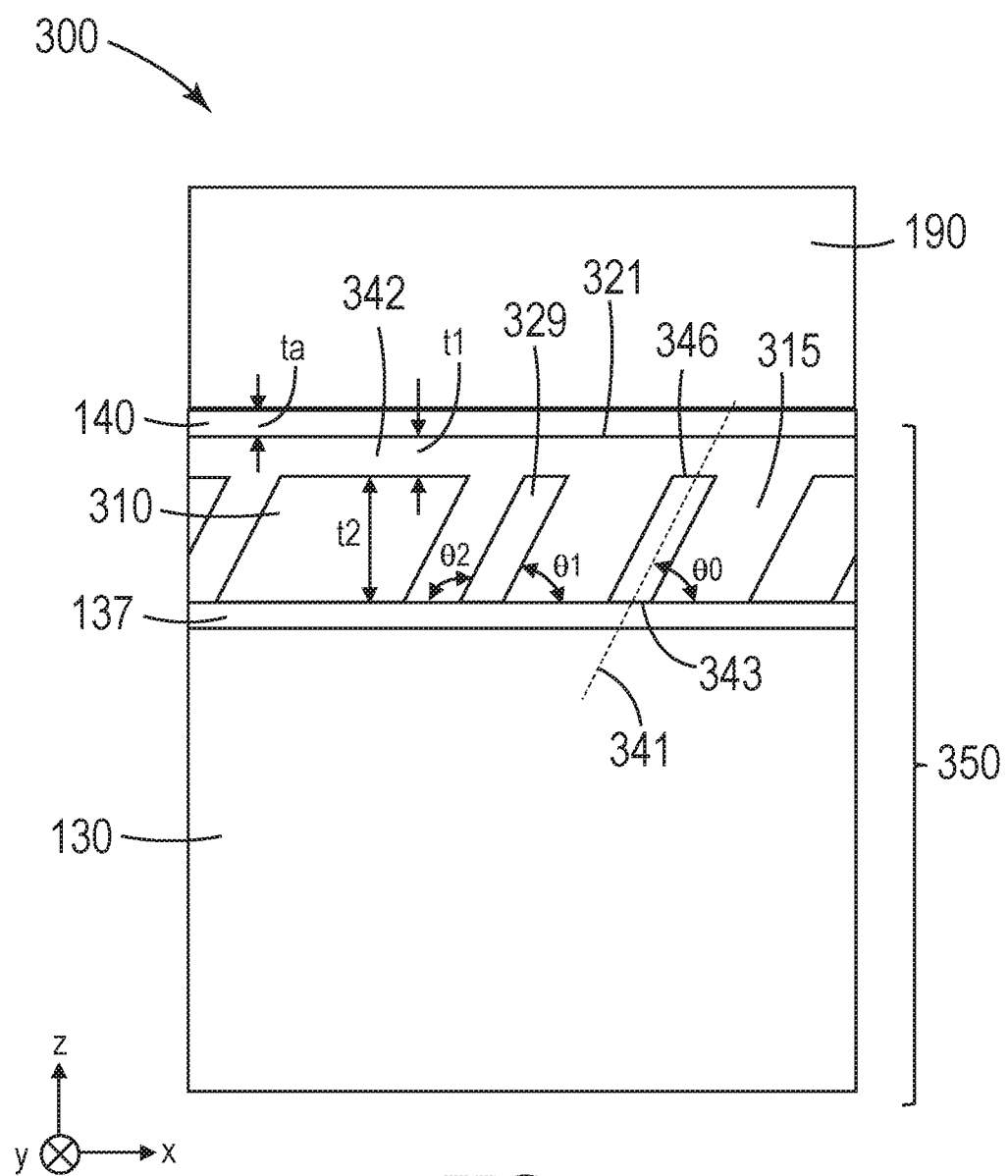

FIGS. 1-3 are schematic cross-sectional views of illustrative optical articles 100, 200, and 300, respectively. In some embodiments, an optical article 100 (resp., 200, 300) includes a waveguide 190 and a structured film 150 (resp., 250, 350). The structured film 150 (resp., 250, 350) includes a polymeric substrate 130, an etch stop layer 137 disposed on the polymeric substrate 130, a structured layer 110 (resp., 210, 310) including a plurality of engineered structures 129 (resp., 229, 329) disposed on a side of the etch stop layer 137 opposite the polymeric substrate 130, a planarizing backfill layer 115 (resp., 215, 315) disposed over the plurality of engineered structures 129 (resp., 229, 329) to define a substantially planar major surface 121 (resp., 221, 321) planarizing backfill layer 115 (resp., 215, 315) having a surface roughness Ra (see, e.g., FIGS. 7A-7C), and an adhesive layer 140 disposed on the substantially planar major surface 121 (resp., 221, 321) of the planarizing backfill layer 115 (resp., 215, 315) and bonding the structured film to the waveguide 190. A difference in index of refraction of the planarizing backfill layer 115 (resp., 215, 315) and the structured layer can be at least 0.25 for at least a first wavelength W1 in a range of 400 nm to 2500 nm or other range described elsewhere herein. The adhesive layer 140 has an average thickness ta, where Ra<ta<¼ W1. The surface roughness Ra is the mean deviation surface roughness. The surface roughness Ra can be determined according to the ISO 4287:1997 standard, for example.

The major surface 121 (resp., 221, 321) can be considered to be substantially planar when any deviation from planarity on a length scale in a transverse direction (e.g., in the x-y plane) substantially larger than the average height t2 (e.g., 100 times t2 or 1000 times t2) is substantially less than the average height t2 (e.g., less than 20%, or less than 10%, or less than 5%, or less than 3% of the average height t2). In some embodiments, a substantial planarized surface has an amount of planarization (P) greater than 50%, or more preferably greater than 75%, and most preferably greater than 90%, where the amount of planarization is given by P=(1−(a1/a2))*100%, where a1 is the relief height of a surface layer (e.g., a planarizing backfill layer) and a2 is the feature height of features covered by the surface layer, as further disclosed in P. Chiniwalla, IEEE Trans. Adv. Packaging 24(1), 2001, 41.

The adhesive layer 140 can have an average thickness in a suitable range for a given application. In some embodiments, the average thickness ta of layer 140 is less than 250 nm, or less than 200 nm, or less than 150 nm, or less than 100 nm, or less than 75 nm, or less than 50 nm, or less than 40 nm, or less than 30 nm. In some such embodiments, or in other embodiments, the average thickness ta is at least 5 nm, or at least 10 nm, or at least 15 nm. In some embodiments, the average thickness ta is chosen to be less than ¼ of a wavelength of interest. For example, for visible light, it may be preferred that the average thickness is less than 100 nm or substantially less than 100 nm (e.g., less than 50 nm) while for near infrared light, the average thickness may be up to 250 nm, for example, or may be even larger when longer wavelengths are of interest. Having a thickness less than ¼ of a wavelength of interest allows the resulting structures which are formed in the one or more unstructured layers to couple to evanescent waves in the waveguide, for example. This can allow the resulting structures to be used as surface relief gratings (SRGs), for example. An SRG, as the term is used herein, includes the case where the grating is embedded in a material having a different refractive index. The structures can be used for optical incoupling and/or outcoupling (e.g., to augmented reality waveguide elements), for example. Alternatively, or in addition, the resulting structures may be used for exit pupil expansion in augmented reality waveguide elements, as a light distribution element, an orthogonal pupil expander, or a redirecting element, for example. Illustrative examples of the use of SRGs in image preserving waveguides can be found in International Pat. Appl. Pub. No. WO 2019/195186 (Peroz et al.), for example.

The layer 140 can be a polymeric or monomeric adhesive layer and/or may be an optically clear adhesive layer. Suitable optically clear adhesives include those available from Norland Products, Inc. (Cranbury, NJ), for example. Other suitable adhesives include thermosetting materials such as those available from the Dow Chemical Company (Midland, MI) under the CYCLOTENE tradename, for example. Still other suitable adhesives include heat-activated adhesives such as those available from KRATON Polymers (Huston, TX) under the KRATON tradename, for example. Suitable adhesive layers, including thin adhesive layers (e.g., less than 50 nm thick), are described in U.S. Pat. No. 7,521,727 (Khanarian et al.); U.S. Pat. No. 7,53,419 (Camras et al.); U.S. Pat. No. 6,709,883 (Yang et al.); and U.S. Pat. No. 6,682,950 (Yang et al.), for example.

The polymeric substrate 130 can be a polyethylene terephthalate (PET) film or a polycarbonate film, for example, which may be dimensionally stabilized (e.g., heat set). Other suitable materials for the polymeric substrate 130 include other polyesters or co-polyesters, polyurethane, polymethylmethacrylate, polystyrene, polyimide, polyethylene naphthalate, polypropylene, and cyclic olefin copolymers, for example. In some embodiments, the polymeric substrate has a low birefringence (maximum in-plane difference in refractive indices at the first wavelength W1 times the thickness of the layer). In some embodiments, the retardance is less than 50 nm, or less than 10 nm, or less than 5 nm, or less than 1 nm.

The waveguide 190 may be a glass waveguide or a polymeric (e.g., polymethylmethacrylate) waveguide, for example. In some embodiments, the waveguide 190 is an image preserving waveguide (e.g., a waveguide such that when a light containing an image (e.g., light from a display) propagates along the waveguide and is then extracted from the waveguide, the extracted light retains the image), for example. In some embodiments, a waveguide combiner includes the waveguide and the structures of the structured film which define optical metasurface input and/or output couplers. Waveguide combiners are described in Kress, "Optical waveguide combiners for AR headsets: features and limitations", Proc. SPIE 11062, Digital Optical Technologies 2019, 110620J (16 Jul. 2019); doi: 10.1117/12.2527680, for example.

In some embodiments, the engineered structures 129 have a length and a width in orthogonal directions (e.g., x- and y-directions), where each direction is orthogonal to the thickness direction (z-direction). In some embodiments, the plurality of engineered structures 129 (resp., 229, 329) is or includes a plurality of nanostructures. Nanostructures are structures having at least two orthogonal dimensions (e.g., at least two of height, length and width) in a range of about 1 nm to about 1000 nm. Engineered structures are structures deliberately made with a predetermined geometry (e.g., predetermined length, width, and height). Some of the representative shapes of the engineered structures (e.g., engineered nanostructures) include, but are not limited to, rectangular, triangular and trapezoidal prisms, fins, cylindrical and truncated-cone shaped pillars, and other such shapes. In some embodiments, the engineered structures have an average aspect ratio (height divided by length or width or largest lateral (orthogonal to height) dimension) of at least 0.1, or at least 0.2, or at least 0.5, or at least 1, or at least 2, or at least 5, or at least 10, for example. The engineered structures can be placed with regular or irregular (e.g., a pseudo-random distribution where the structures may appear randomly arranged but are made from an underlying deterministic process) pitch, orientation, and/or shapes, possibly dependent on application functionality and manufacturability.

In some embodiments, the planarizing backfill layer 115 (resp., 215, 315) includes a residual layer 142 (resp., 242, 342) between the adhesive layer 140 and the structured layer 110 (resp., 210, 320). The residual layer may be described as the portion of the backfill layer above the tops of the structures (in positive z-direction) of the structured layer. In some embodiments, a ratio of an average (unweighted mean) thickness $t1$ of the residual layer 142 to an average height $t2$ of the plurality of engineered structures is less than 1, or less than 0.5, or less than 0.3, or less than 0.25. In some embodiments, $t1/t2$ is in a range of 0.001 to 0.5, for example. In some embodiments, a maximum thickness $(t1+t2)$ of the planarizing backfill layer is no more than 2, or no more than 1.5, or no more than 1.3 times the average height $t2$ of the plurality of engineered structures. In some embodiments, the thickness of the residual layer 142 is less than 100 nm, or less than 50 nm, or less than 30 nm, or less than 20 nm, or less than 10 nm.

The major surface 121 (resp., 221, 321) can be considered to be substantially unstructured when any structures that might be present in the surface has a height substantially smaller than the average height $t2$ (e.g., less than 20%, or less than 10%, or less than 5%, or less than 3% of the average height $t2$). The major surface 121 (resp., 221, 321) an be considered to be substantially planar when any deviation from planarity on a length scale in a transverse direction (e.g., in the x-y plane) substantially larger than the average height $t2$ (e.g., 100 times $t2$ or 1000 times $t2$) is substantially less than the average height $t2$ (e.g., less than 20%, or less than 10%, or less than 5%, or less than 3% of the average height $t2$).

In some embodiments, the polymeric substrate 130 is releasably attached to the etch stop layer 137 and is removed after the structured film is bonded to the waveguide (see, e.g., FIGS. 4A to 6C). Alternatively, in some embodiments, after the structured film is bonded to the waveguide, the polymeric substrate 130 is removed by dissolving the layer in acid. In either case, after the polymeric substrate 130 has been removed, the etch stop layer 137 may optionally be removed via reactive ion etching, for example.

Two layers are releasably attached to one another when the layers can be separated from one another with little or no damage to either layer (e.g., sufficiently little damage that the damage is not readily visible to the unaided eye of a person with 20/20 vision). First and second layers being releasably attached to one another includes the case where a third layer is disposed between the first and second layers where the third layer is adapted facilitate the separation of the first and second layers (e.g., the third layer may be adapted to split apart or to separate from at least one of the first and second layers). The third layer may be adapted to facilitate the separation of the first and second layers only after activation (e.g., via irradiation or chemical activation, or thermal activation) of the third layer. For example, the third layer may be a dynamic separating layer. A dynamic separating layer is a layer that can be changed from a first state to at least a second state (e.g., by activating the separating layer via irradiation) where the layer provides a higher adhesion to at least one adjacent layer in the first state and a lower adhesion to the at least one adjacent layer in the second state. For example, a dynamic separating layer can be a photo-induced stress mode release layer (e.g., a polymeric layer that can be crosslinked or further crosslinked upon irradiation such that the increase in crosslinking generates stress which facilitates release from adjacent layer(s)) and/or a light-to-heat conversion (LTHC) layer.

The structured film can be configured such that the polymeric substrate 130 is releasably attached to the etch stop layer 137 by including a parting layer between the polymeric substrate 130 and the etch stop layer 137, or by including a dynamic separating layer between the polymeric substrate 130 and the etch stop layer 137 and activating (e.g., via irradiating) the dynamic separating layer. The parting layer is a static separating layer that can be a low surface energy layer, for example, or can be a layer (e.g., separating layer 160' illustrated in FIG. 5A, according to some embodiments) coextruded with the polymeric substrate 130 and weakly adhered to the polymeric substrate 130 as generally described in U.S. Pat. No. 9,415,561 (Lindquist et al.), for example. A dynamic separating layer (e.g., a LTHC layer) may include a plurality of sublayers. Suitable dynamic separating layers include carbon black nanocomposites, thin optically absorbing metal (e.g., aluminum, titanium, or chromium) layers, and light absorbing optical cavities such as those defined by thin (e.g., 10 to 30 nm) metal (e.g., aluminum, titanium, or chromium) layers separated by a polymeric layer such as an acrylate layer. A dynamic separating layer can be formed from 3M Light-To-Heat Conversion Release Coating (LTHC) Ink (available from 3M Company, St. Paul, MN), for example. Other suitable dynamic separating layers include the LTHC layers described in U.S. Pat. No. 7,977,864 (Bellmann et al.) and U.S. Pat. No. 7,670,450 (Lamansky et al.), for example.

In some embodiments, an additional layer 160 is disposed between the etch stop layer 137 and the polymeric substrate 130. This is schematically illustrated in FIG. 2, for example, for a structured film 250 that may correspond to structured film 150 except for the additional layer 160. Similarly, an additional layer 160 can optionally be included between the etch stop layer 137 and the polymeric substrate 130 of the structured film 350 of FIG. 3. The additional layer 160 can be a low index layer or a parting or separating layer, for example. In some embodiments, the additional layer 160 is a dynamic separating layer (e.g., a light-to-heat conversion (LTHC) layer) disposed between the etch stop layer 137 and the polymeric substrate 130. In some such embodiments, an additional polymeric layer is disposed between the etch stop layer 137 and the layer 160 (see, e.g., FIGS. 5B-5C). In some embodiments, a dynamic separating layer is included, and a low index layer is included between the dynamic separating layer and the etch stop layer 137. In some embodiments, the dynamic separating layer 160 is adapted to facilitate separation of the polymeric substrate and the etch stop layer upon activation. Activation can be via irradiation, for example. Suitable radiation may include one or more wavelengths, including visible, infrared, or ultraviolet radiation, from a laser, lamp, or other radiation source. Useful radiation conditions are described in U.S. Pat. No. 7,977,864 (Bellmann et al.), for example.

Figure 4A:
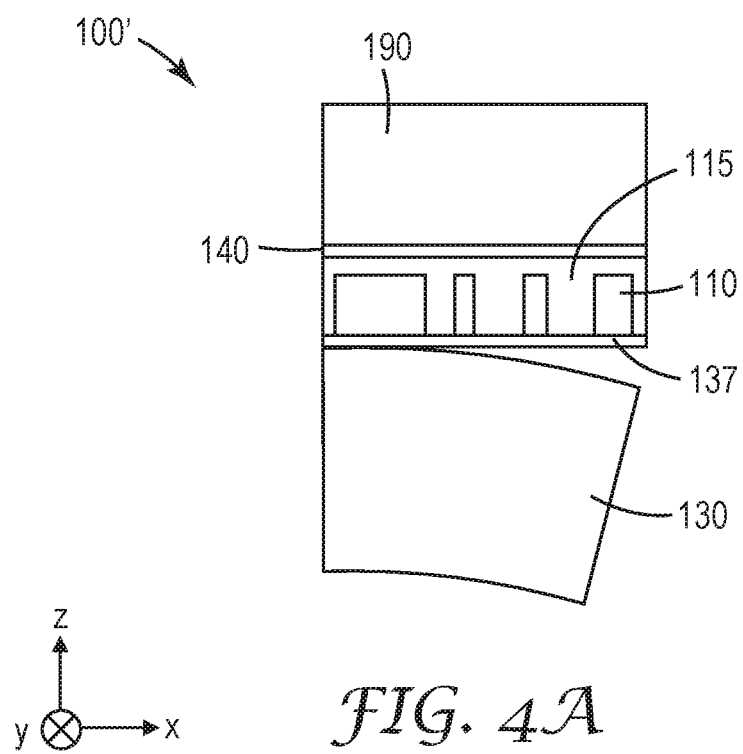
FIG. 4A-4B schematically illustrate removing polymeric substrates from optical articles, according to some embodiments.
Figure 4B:
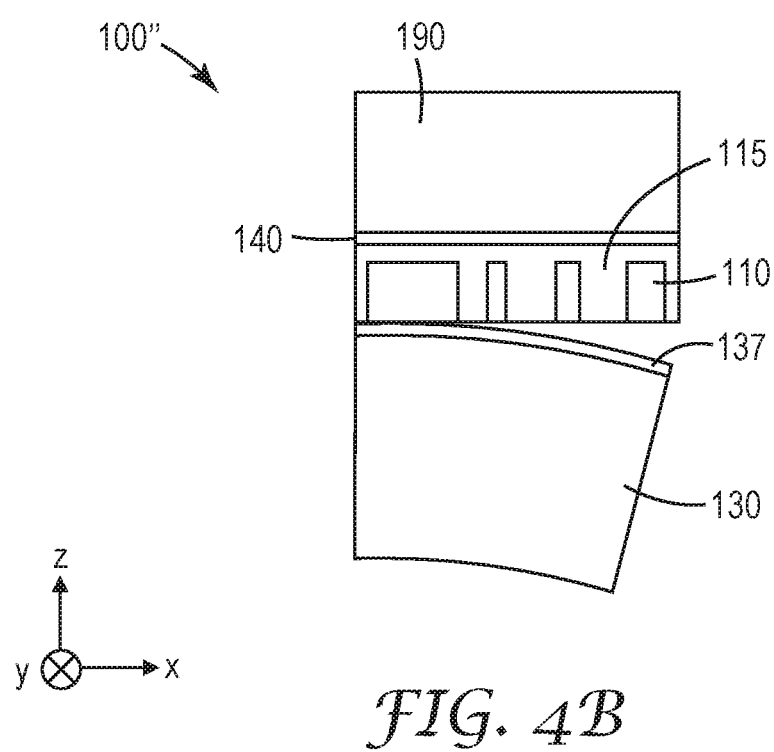

FIGS. 4A to 5C schematically illustrate various methods of removing the polymeric substrate 130. In FIGS. 4A-4B, optical articles 100' and 100" can correspond to optical article 100, for example. Optical article 100' is configured such that the polymeric substrate 130 is releasably attached to the etch stop layer 137. In this embodiment, and in some other embodiments, there is a parting interface between the polymeric substrate 130 and the etch stop layer 137 that may arise from a surface treatment applied to the polymeric substrate 130 prior to applying the etch stop layer 137 to the polymeric substrate 130. Optical article 100" is configured such that the etch stop layer 137 is releasably attached to the layers 110 and 115. In this embodiment, and in some other embodiments, there is a parting interface between the etch stop layer 137 and the layers 110 and 115 that may arise from a surface treatment applied to the the etch stop layer 137 prior to disposing the layer 110' (see FIG. 7A), for example, on the etch stop layer 137.

Figure 5A:
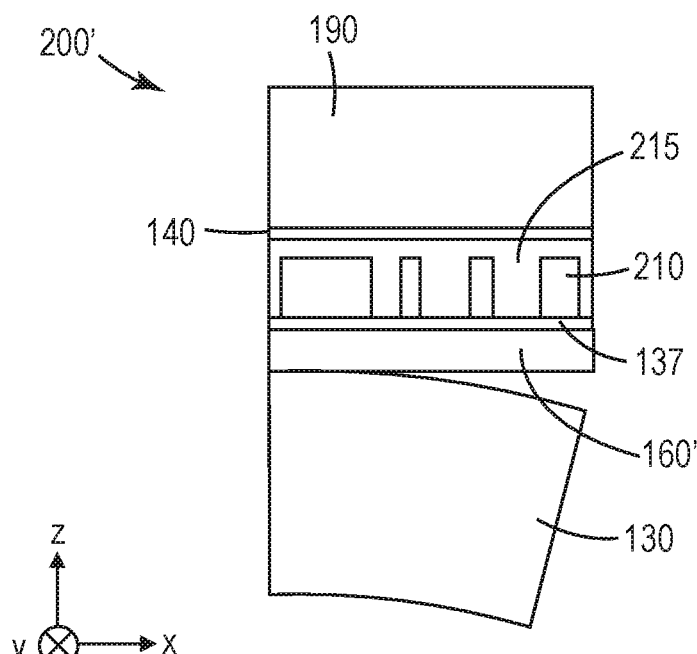
FIG. 5A-5C schematically illustrate removing polymeric substrates from optical articles that include a separating layer, according to some embodiments.
Figure 5B:
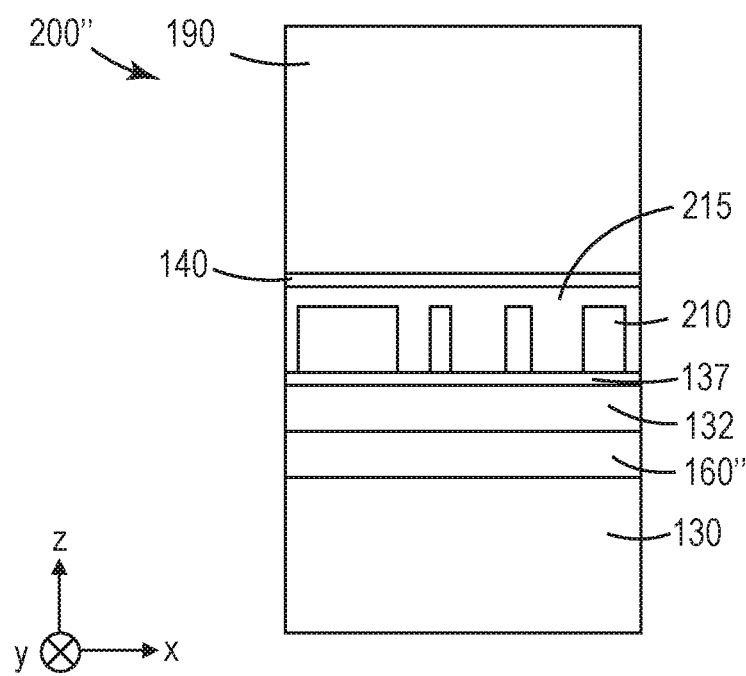
Figure 5C:
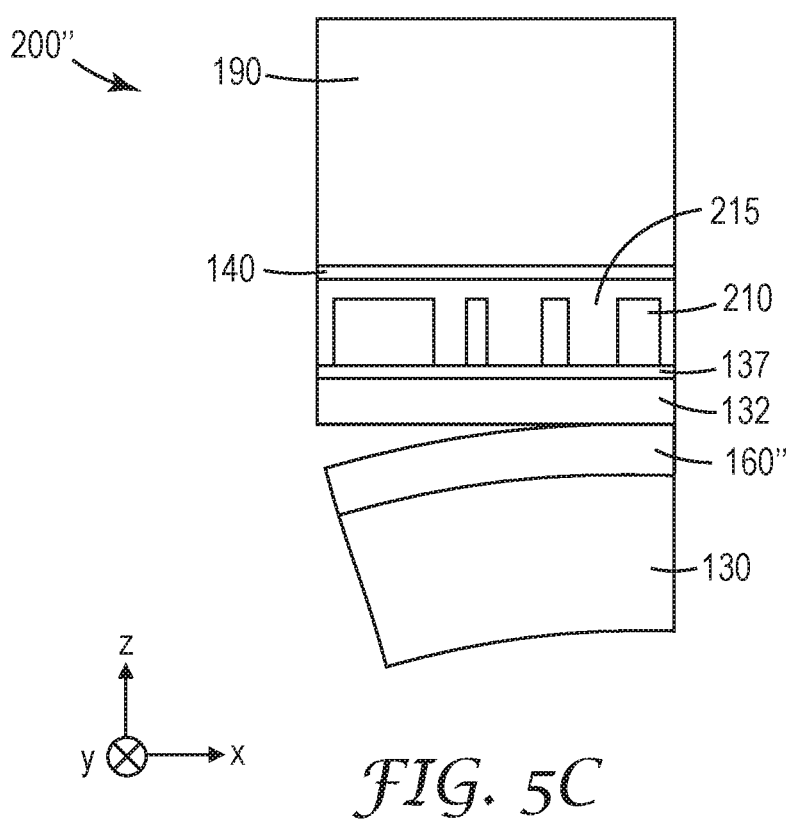

In FIGS. 5A-5C, optical articles 200' and 200" can correspond to optical article 200, for example. In FIG. 5A, the polymeric substrate is releasably attached to separating layer 160' which may be a static separating layer (e.g., coextruded with the polymeric substrate 130) or a dynamic separating layer. In this embodiment, and in some other embodiments, there is a parting interface between the polymeric substrate 130 and the separating layer 160' which may result from coextrusion of the polymeric substrate 130 and the separating layer 160' as generally described in U.S. Pat. No. 9,415,561 (Lindquist et al.), for example. In FIG. 5B, a dynamic separating layer 160" is disposed between the polymeric substrate 130 and the etch stop layer 137. An additional substrate layer 132 is disposed between the dynamic separating layer 160" and the etch stop layer 137. The additional substrate layer 132 may be a low index layer (e.g., having a refractive index in a range described elsewhere herein for low index layers), for example. The dynamic separating layer 160" can be adapted to be releasably attached to the additional substrate layer 132 upon activation. In this embodiment, and in some other embodiments, upon activation, there is a parting interface between the dynamic separating layer 160" and the additional substrate layer 132 as schematically illustrated in FIG. 5C.

In some embodiments, a structured film 250 includes a polymeric substrate 130, an etch stop layer 137, a dynamic separating layer 160 disposed between the polymeric substrate and the etch stop layer, a structured layer 210 including a plurality of engineered structures 229 disposed on a side of the etch stop layer 137 opposite the dynamic separating layer 160, a planarizing backfill layer 215 disposed over the plurality of engineered structures 229 to define a substantially planar major surface 221 of the planarizing backfill layer 215 having a surface roughness Ra, and an adhesive layer 140 having an average thickness ta disposed on the substantially planar major surface 221 of the planarizing backfill layer 215. In some embodiments, the dynamic separating layer is adapted to facilitate separation of the polymeric substrate 130 and the etch stop layer 137 upon activation (e.g., via irradiation). For example, the dynamic separating layer 160 may be adapted to release from the etch stop layer 137 upon activation (e.g., via irradiation) or the dynamic separating layer 160 may be adapted to release from an additional layer disposed between the etch stop layer 137 and the dynamic separating layer (see, e.g., FIG. 5C) upon activation. In some embodiments, a difference in index of refraction of the planarizing backfill layer 215 and the structured layer 210 is at least 0.25 for at least a first wavelength W1 in a range of 400 nm to 2500 nm or other range described elsewhere herein. In some embodiments, Ra<ta<¼ W1.

In some embodiments, it is desired to retain the polymeric substrate 130 in the structured film. However, in some cases, it is desired to have a layer (e.g., air or a low index cladding layer) with a lower refractive index than the polymeric substrate 130 adjacent to the etch stop layer 137. Such a layer can be included to improve optical confinement in the planarizing backfill and structured layers. In some embodiments, the additional layer 160 is a low index unstructured layer. Suitable low index layers include nanoporous coatings, xerogels, and aerogels, perfluoropolyethers, TEFLON, CYTOP materials, hexafluoropropylene oxide (HFPO), or fluorenol methacrylate, for example. Useful low index layers are described in U.S. Pat. No. 8,808,811 (Kolb et al.), for example. In some embodiments, the additional layer 160 is a fluoropolymer layer. The low index layer may have a refractive index in a range of 1.1 to 1.45, or 1.15 to 1.4, or 1.2 to 1.35, for example, for at least the first wavelength W1. In some embodiments, the low index layer has a thickness of at least 50 nm, or at least 100 nm, or at least 2 times t2, or at least 5 times t2, for example. In some such embodiments, or in other embodiments, the low index layer has a thickness of no more than 10 micrometers, or no more than 5 micrometers, for example. In some embodiments, the structured film 250 includes an unstructured layer 160 disposed between the etch stop layer 137 and the polymeric substrate 130, where a difference in index of refraction of the planarizing backfill layer 215 and the unstructured layer 160 is at least 0.2, or at least 0.25 for at least the first wavelength W1.

In some embodiments, the engineered structures 129 or 229 are slanted relative to the etch stop layer 137. FIG. 3 is a schematic cross-sectional view of an article 300 including a structured film 350 having engineered structures 329 slanted relative to the etch stop layer 137. In some embodiments, a structured film 350 includes a polymeric substrate 130, an etch stop layer 137 disposed on the polymeric substrate 130, a structured layer 310 including a plurality of engineered structures 329 disposed on a side of the etch stop layer 137 opposite the polymeric substrate 130 where the engineered structures 329 are slanted relative to the etch stop layer 137, a planarizing backfill layer 315 disposed over the plurality of engineered structures 329 to define a substantially planar major surface 321 having a surface roughness Ra, and an adhesive layer 140 having an average thickness ta disposed on the substantially planar major surface of the planarizing backfill layer. In some embodiments, a difference in index of refraction of the planarizing backfill layer 315 and the structured layer 310 is at least 0.25 for at least a first wavelength W1 in a range of 400 nm to 2500 nm or other range described elsewhere herein. In some embodiments, Ra<ta<¼ W1.

An engineered structure is slanted when a line passing through centers of the top (facing away from the etch stop layer 137) and bottom (facing the etch stop layer 137) of the structure makes an angle with the etch stop layer 137 that is in a range of 5 to 85 degrees. The centers can be the centroids of the top and bottom of the structure in the case of top and bottom facets. For example, an engineered structure 329 can be described as slanted when a line 341 passing through a centroid of a facet 343 of the engineered structure facing the etch stop layer 137 and through a centroid of an opposite facet 346 facing away from the etch stop layer 137 or, in the case of a pointed engineered structure, through the point, makes an angle θ0 with the etch stop layer 137 that is in a range of 5 to 85 degrees. A slanted engineering structure may have opposing sidewalls making angles θ1 and θ2 with the etch stop layer 137. The angles θ0 and θ2 are exterior angles (angles exterior to the structures 329). The angle θ0 and/or the angle θ1 can be at least 45 degrees, or at least 50 degrees, for example, and/or can be no more than 85 degrees, or no more than 80 degrees, or no more than 75 degrees, for example. In some embodiments, angle θ0 and/or the angle θ1 is in a range of 45 to 85 degrees or 50 to 80 degrees, for example. The angle θ2 can be about 180 degrees minus θ1 or can be different. In some embodiments, the angle θ2 is in a range of 95 to 135 degrees, for example. In some embodiments, each engineered structure in at least a majority (or at least 60%, or at least 80%, or at least 90%) of the engineered structures has a sidewall defining an exterior angle θ1 with the etch stop layer 137 in a range of 45 to 85 degrees. The structured layer 310 can optionally include structures which are not slanted in addition to the slanted engineered structures 329. In some embodiments, at least 60%, or at least 80%, or at least 90% of all the engineered structures defined in the structured layer 310 are slanted relative the etch stop layer 137.

Figure 6A:
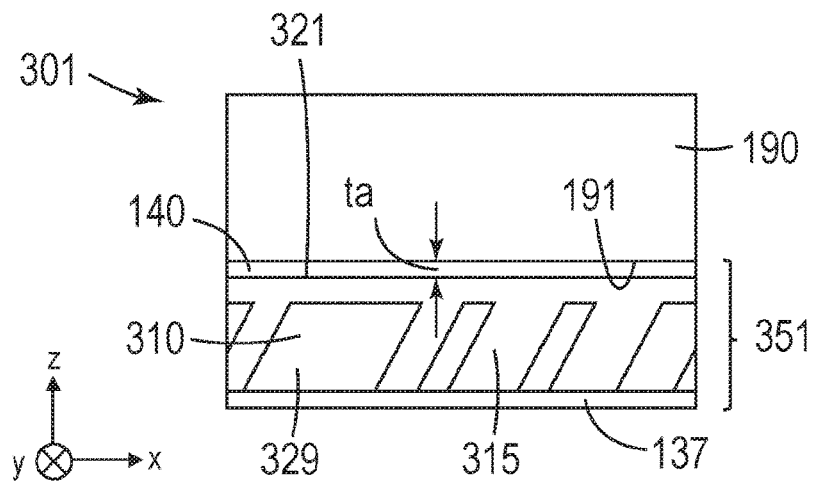
FIGS. 6A-6C are schematic cross-sectional views of optical articles that include a waveguide and a structured film including slanted structures, according to some embodiments.
Figure 6B:
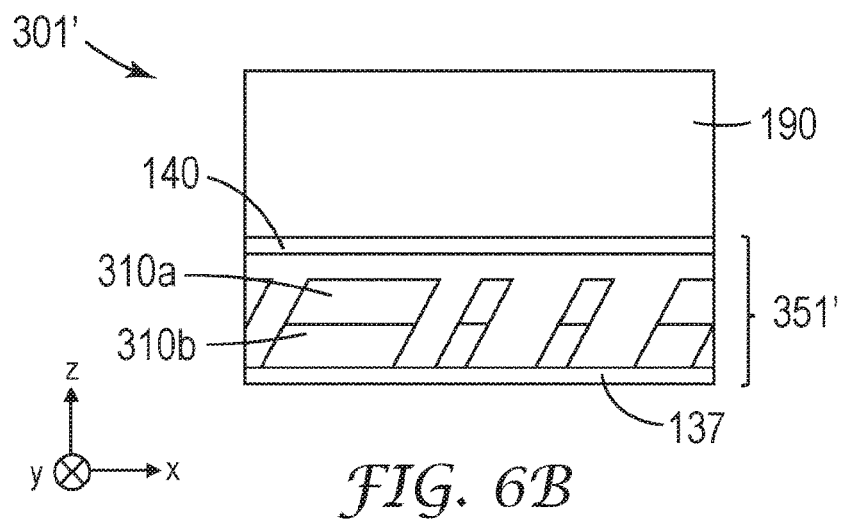
Figure 6C:
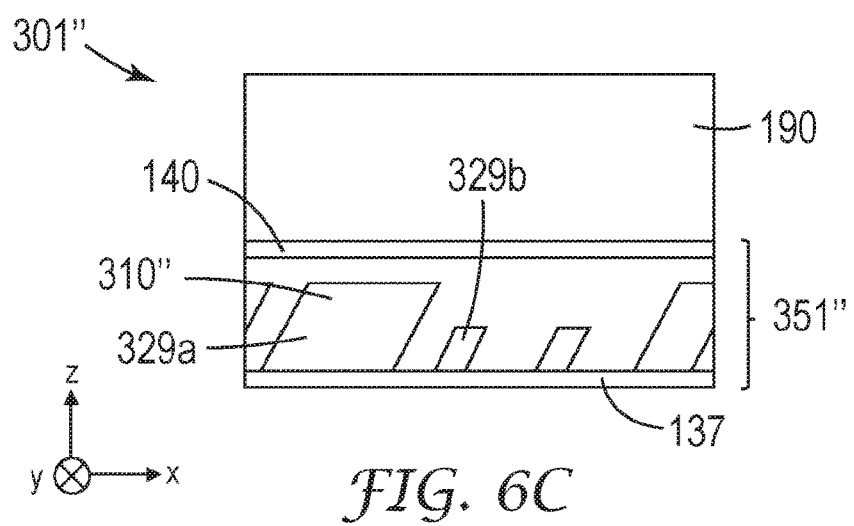

In some embodiments, after the structured film 150, 250 or 350 has been bonded to the waveguide, the polymeric substrate 130 is removed. FIGS. 6A-6C are schematic cross-sectional views of illustrative articles that can be formed by bonding a structured film to a waveguide 190 and then removing the polymeric substrate 130. FIG. 6A schematically illustrates structured film 351 which can be formed from structured film 350 by removing the polymeric substrate 130. Similarly, structured films can be obtained from structured films 150 and 250 by removing the polymeric substrate 130 and optionally the additional layer 160 for structured film 250.

In some embodiments, an optical article 301 (or 301', 301" depicted in FIGS. 6B-6C) includes a waveguide 190 and a structured film 351 disposed on a major surface 191 of the waveguide 190. The structured film 351 includes an etch stop layer 137, a structured layer 310 disposed on the etch stop layer 137 and including a plurality of engineered structures 329 where the engineered structures 329 are slanted relative to the etch stop layer 137, a planarizing backfill layer 315 disposed over the plurality of engineered structures 329 to define a substantially unstructured major surface 321 of the planarizing backfill layer 325 having a surface roughness Ra, and an adhesive layer 140 disposed on the substantially unstructured major surface 321 of the planarizing backfill layer 315 where the adhesive layer 140 bonds the structured film 351 to the major surface 191 of the waveguide 190 and has an average thickness ta. In some embodiments, a difference in index of refraction of the planarizing backfill layer 315 and the structured layer 310 is at least 0.25 for at least a first wavelength W1 in a range of 400 nm to 2500 nm or other range described elsewhere herein. In some embodiments, Ra<ta<¼ W1.

In some embodiments, the structured layer 110, 210, or 310 includes a plurality of sublayers. For example, the structured layer can be formed by etching an unstructured layer, as described further elsewhere herein, and the unstructured layer can include a stack of sublayers so that the resulting engineered structures has sublayers. FIG. 6B is a schematic cross-sectional view of an article 301' including a structured film 351' bonded to a waveguide 190, according to some embodiments. The structured film 351' includes a structured layer 310a, 310b including a first sublayer 310a disposed on a second sublayer 310b.

In some embodiments, the plurality of engineered structures 129, 229, or 329 includes structures having a least two different heights. For examples, structures with at least two different heights can be formed by etching through an etch resist layer having structures with at least two different heights. For example, referring to FIGS. 7A-7C, the mask layer 131 can be omitted and the etch resist layer 125, 225, or 325 can be a multilevel resist layer so that the pattern transfer process can provide a multilevel pattern in the previously unstructured layer 110', 210', or 310', respectively. FIG. 6C is a schematic cross-sectional view of an article 301" including a structured film 351" bonded to a waveguide 190, according to some embodiments. The structured film 351" includes a structured layer 310" including structures 329a and 329b having different heights. In some embodiments, the structured layer 310" includes a plurality of sublayers and the taller structures 329a include more sublayers that the shorter sublayers 329b. For example, an upper sublayer of structures 329b, but not structures 329a, may have been removed via etching.

Figure 7A:
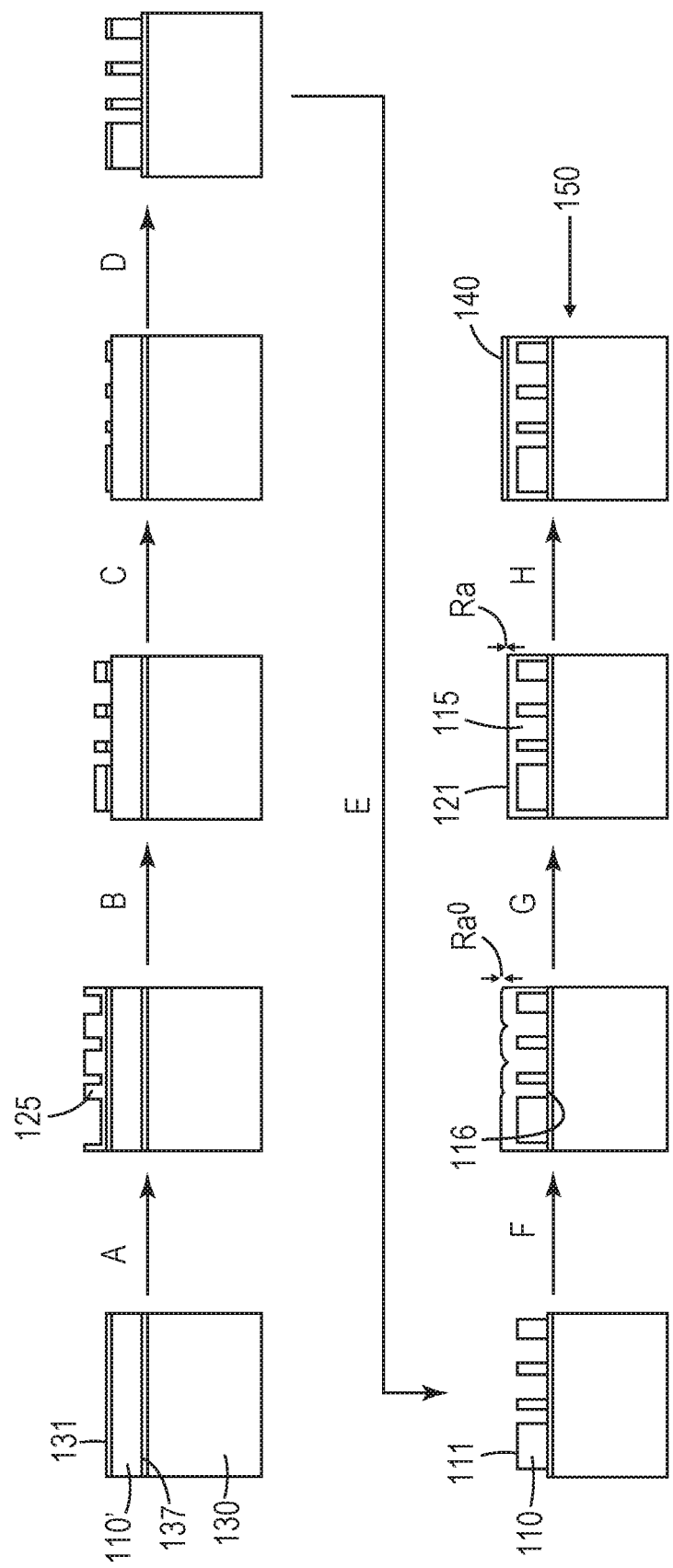
FIGS. 7A-7C schematically illustrate processes for making structured films, according to some embodiments.
Figure 7B:
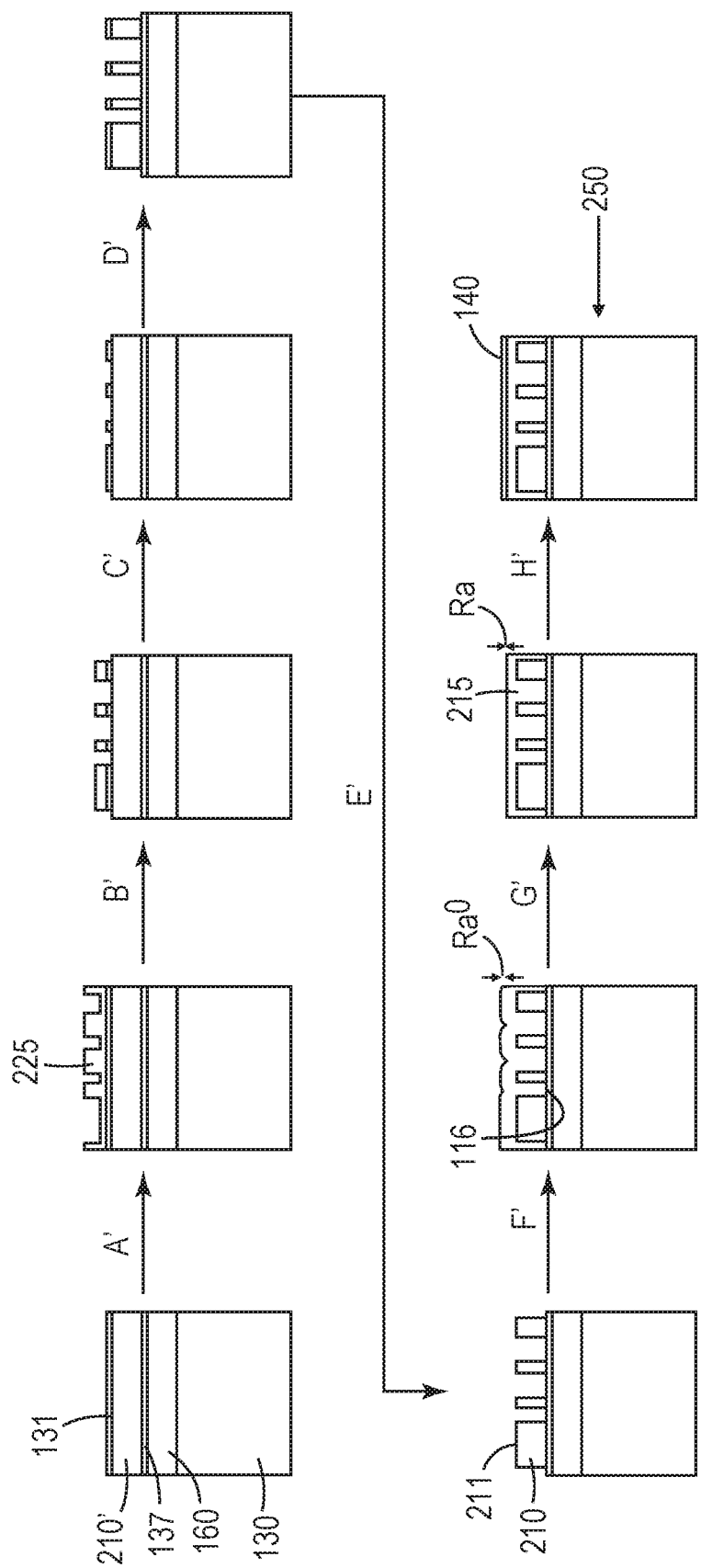
Figure 7C:
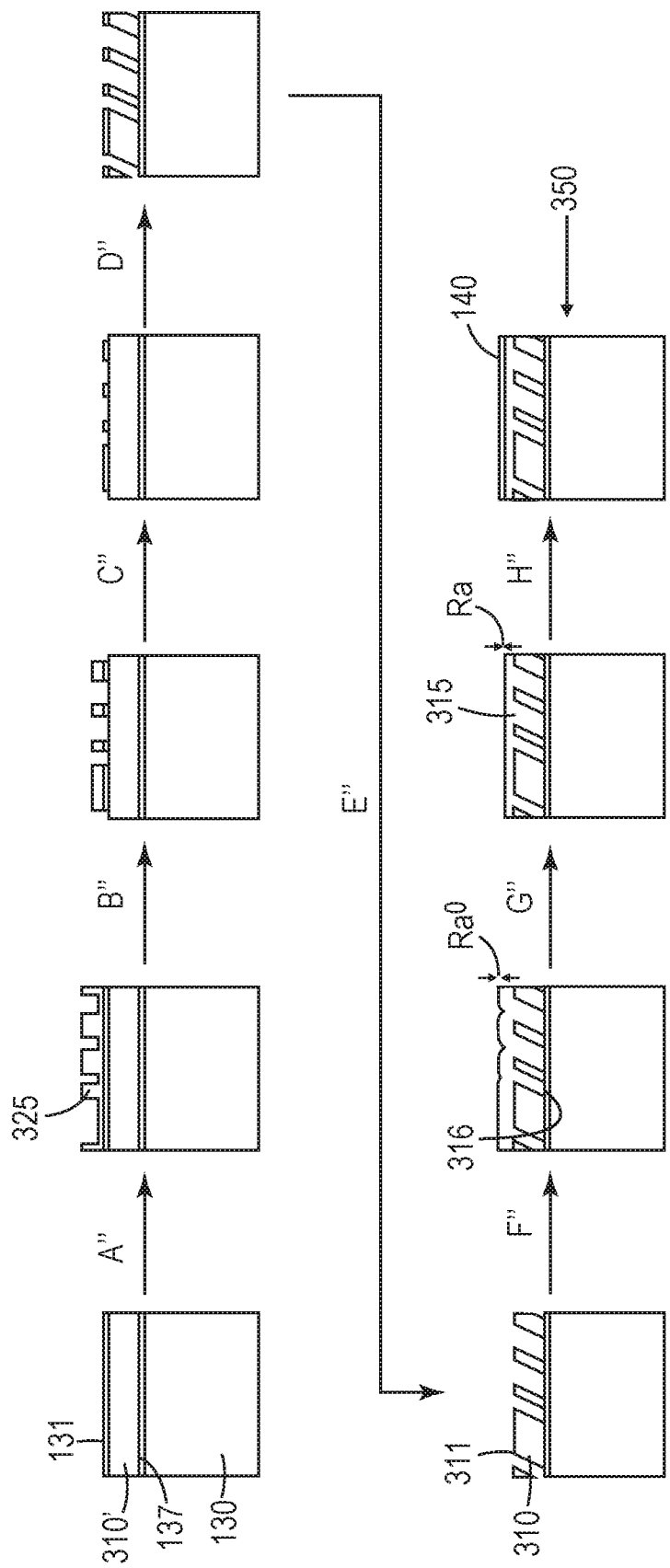

FIGS. 7A-7C schematically illustrate processes for making structured films 150, 250, and 350 respectively. An input film (e.g., a roll of film) includes the polymeric substrate 130, the etch stop layer 137 disposed on the polymeric substrate 130, an unstructured layer 110' (resp., 210', 310') disposed on the unstructured layer, and a mask layer 131 disposed on the unstructured layer. In step A (resp., A', A"), an etch resist layer 125 (resp., 225, 325) is disposed on the mask layer 131. The etch resist layer can be formed via replication from a tool as described further elsewhere herein. The mask layer 131 may optionally be omitted (e.g., when relatively low aspect ratio structures are desired or when a multilevel structured layer is desired) in which case the etch resist layer can serve as the etch mask for etching into the unstructured layer. In step B (resp., B', B"), a breakthrough etch is performed followed by etching of the mask layer 131. Both etching steps may utilize reactive ion etching (RIE), for example. In step C (resp., C', C"), the etching continues until the etch resist layer 125 (resp., 225, 325) has been removed. In step D (resp., D', D"), etching conditions are changed (e.g., to oxygen RIE) to etch into the unstructured layer 110' (resp., 210', 310') until the vias reach the etch stop layer 137.

In step D" of FIG. 7C, directional etching (e.g., directional RIE) is carried out at an oblique angle to produce slanted structures. Etching at an oblique angle to produce slanted structures is described in U.S. Pat. No. 10,670,862 (Vallius et al.) and U.S. Pat. Appl. Pub. No. 2016/0033784 (Levola et al.), for example. In step E (resp., E', E"), etching is continued until the mask layer 131 is removed. The structured layer 110 (resp., 210, 310) in combination with exposed portions of the mask layer can define major surface 111 (resp., 211, 311) facing away from the polymeric substrate 130. In step F (resp., F', F"), the vias are backfilled with a planarizing backfill (e.g., via atomic layer deposition). The planarizing backfill may have a major surface 116 (resp., 216, 316) facing and substantially conforming (e.g., deviate from conforming by no more than 20% or no more than 10% of t2) to the major surface 111 (resp., 211, 311). The planarizing backfill may have a higher than desired roughness $Ra^0$ with troughs or valleys corresponding to the underlying vias. In some embodiments, a step G (resp., G', G") is carried out to reduce the surface roughness to $Ra<Ra^0$. In some embodiments, Ra is less than 30 nm, or less than 20 nm, or less than 10 nm, or less than 5 nm, or less than 2 nm, or less than 1 nm, or less than 0.5 nm. In some such embodiments, or in other embodiments, $Ra^0-Ra$ is greater than 10 nm, or greater than 20 nm, or greater than 40 nm, or greater than 80 nm. In some embodiments, smoothing the rough surface is carried out by chemical-mechanical planarization (e.g., using an abrasive with a corrosive chemical slurry) as generally described in U.S. Pat. No. 6,623,355 (McClain et al.) and U.S. Pat. No. 9,200,180 (Banerjee et al.), for example. In some embodiments, smoothing the rough surface is carried out by a combination of mechanical polishing and dry etching as generally described in U.S. Pat. No. 6,858,537 (Brewer), for example. In step H (resp., H, H'), an adhesive layer 140 is applied to the planarizing backfill layer 115 (resp., 215, 315). In some applications (e.g., for visible optics applications), a surface roughness of less than 5 nm, or less than 2 nm, or less than 1 nm, or less than 0.5 nm may be preferred. In some embodiments, a removable liner is applied to the adhesive layer 140 before sheeting and/or storing the structured film.

The etching steps of FIGS. 7A-7C may be plasma etching steps. Where high aspect ratio structures are desired, ion-assisted plasma processing is conveniently used. Methods for achieving anisotropic etching include reactive ion etching (RIE), high density ion source processing, or a combination of high-density ion source processing along with RIE. High density plasmas can be generated by inductive radio-frequency, or microwave coupling, or by helicon ion sources. Linear high-density plasma sources are particularly advantageous for generating high aspect ratio features. Combining high density plasmas with RIE enables the decoupling of the ion generation (by high density plasma) from the ion energy (by RIE bias voltage).

The RIE method includes etching portions of a major surface not protected by a masking layer to form a structure (e.g., nanostructure) on the substrate. In some embodiments, the method can be carried out using a continuous roll-to-roll process referred to as "cylindrical reactive ion etching" (cylindrical RIE). Cylindrical RIE utilizes a rotating cylindrical electrode to provide anisotropically etched nanostructures on the surface of a substrate or article. In general, cylindrical RIE can be described as follows. A rotatable cylindrical electrode ("drum electrode") powered by radio-frequency coupling and a grounded counter-electrode are provided inside a vacuum vessel. The counter-electrode can comprise the vacuum vessel itself. An etchant gas is fed into the vacuum vessel, and a plasma is ignited and sustained between the drum electrode and the grounded counter-electrode.

A continuous substrate including a patterned masking layer can then be wrapped around the circumference of the drum and the substrate can be etched in the direction normal to the plane of the substrate. The exposure time of the substrate can be controlled to obtain a predetermined etch depth of the resulting nanostructure. The process can be carried out at an operating pressure of approximately 1-10 mTorr. Cylindrical RIE is described, for example, in U.S. Pat. No. 8,460,568 (David et al.).

The chemistry of the plasma environment can be controlled to achieve selectivity of etching, when multiple materials are present. Oxygen, and mixtures of oxygen with fluorinated gases are used to etch carbon containing materials such as polymers, diamond-like carbon, and diamond, for example. The concentration of the fluorine in the plasma can be selected to optimize the etching rate and selectivity. Typically, a small amount of fluorinated gas is used to dramatically increase the etching rate of hydrocarbon polymers by as much as 300%.

To etch siliceous materials (silicon dioxide, $SiO_x$, diamond-like glass, silicon nitride, silicon carbide, silicon oxycarbide, polysiloxane, silsesquioxane (SSQ) resins, etc), mixtures of fluorocarbons such as $CF_4$, $C_2F_6$, and/or $C_3F_8$, for example, are used in combination with oxygen. The etch selectivity between siliceous materials and hydrocarbon polymers may be carefully tailored by obtaining the etching profiles of these materials as a function of the F/O atomic ratio in the plasma feed gas mixture. Oxygen rich conditions provide excellent selectivity of etching hydrocarbon polymers and diamond-like carbon (DLC) while using siliceous materials as the masking layer. In contrast, fluorine rich conditions provide excellent selectivity of etching siliceous materials while using hydrocarbon polymer-based masking materials.

Fluorinated plasma chemistries may be used for etching other masking materials such as tungsten, whose fluorides are volatile. Chlorine containing gas mixtures may be used to etch materials whose chlorides are volatile, such as aluminum and titanium. Oxides, nitrides, and carbides of these etchable metals can also be etched by using chlorine-based chemistries. Silicon nitride, aluminum nitride, and titanium oxide are high index materials that may be etched with chlorine chemistries.

The various layers (e.g., mask layer 131; the etch stop layer 137; the layers 110', 210', 310'; the backfill layers 115, 215, 315; or the adhesive layer 140), may be deposited using a variety of deposition methods considering the material type the layer thickness. Suitable deposition methods may include a chemical vapor deposition (CVD) method, a sputter coating method, a physical vapor deposition (PVD) method, an atomic layer deposition (ALD) method, or a combination thereof, for example. A thin layer or film can be coated onto a flat or structured surface using coating methods known in the art such as slot die coating, slide coating, curtain coating, knife coating, blade coating, dip coating, and spin coating. Slot die coating equipment is described in U.S. Pat. No. 5,639,305 (Brown et al.) and U.S. Pat. No. 7,591,903 (Maier et al.), for example. A spin coater is described in U.S. Pat. No. 6,033,728 (Kikuchi et al.), for example.

The planarizing backfill layer (e.g., 115, 215, 315) can be formed from any suitable material. Preferably, the planarizing backfill layer is formed from a material having a refractive index at least 0.2, or at least 0.25, or at least 0.3, or at least 0.35 higher than that of the structured layer (e.g., 115, 215, 315) for at least the first wavelength W1. Suitable materials for the backfill layer include zirconia or titania-filled acrylate resins which may be deposited via coating, for example; metal oxides, nitrides, and oxynitrides including oxides, nitrides, and oxynitrides of Si, Ti, Zr, Hf, Nb, Ta, or Ce, for example, which may be vapor deposited, for example; and parylenes which may be applied via coating, for example. Since silicon is a metalloid, silicon oxides, silicon nitrides, and silicon oxynitrides are considered to be metal oxides, metal nitrides, and metal oxynitrides, respectively. In some cases, titania ($TiO_2$) may be preferred for optical applications involving visible light while silicon or other metal oxides may be used for applications involving near infrared light. The structured layer can be formed from any of the low index materials, for example, described elsewhere herein. The structured layer can be a fluoropolymer layer, for example. In some embodiments, the structured layer includes a fluoropolymer and the planarizing backfill layer includes a metal oxide, nitride or oxynitride. In some embodiments, for at least the first wavelength W1, the structured layer has a refractive index of no more than 1.4 and the planarizing backfill layer has a refractive index of at least 1.65 or at least 1.7.

In some embodiments, the wavelength(s) of interest are in a visible or near infrared range. Accordingly, the first wavelength W1 can be in the range of 400 nm to 2500 nm. In some embodiments, visible wavelengths are of primary interest. Accordingly, the first wavelength W1 can be in the range of 400 nm to 700 nm. In some embodiments, near-infrared wavelengths are of primary interest. Accordingly, the first wavelength W1 can be in the range of 700 nm to 2500 nm or 800 nm to 2000 nm, for example. Some specific near-infrared wavelengths that may be of interest depending on the application include 850 nm, 905, nm, 940 nm, 1060 nm, 1330 nm, and 1550 nm, for example.

In some embodiments, the etch resist layer 125, 225, or 325 includes a silicone-containing polymer. In some embodiments, the etch resist layer includes a siloxane, a silicone, or a silsesquioxane. In some embodiments, the etch resist layer includes a crosslinked acrylate. Suitable etch resist layers are described in U.S. Pat. No. 5,811,183 (Shaw et al.), for example. The etch resist layer may have a total thickness in a range of 50 nm to 500 nm, for example.

The etch resist layer 125, 225, or 325 may be formed using different pattern printing, transferring, tiling, copying, or replication technologies, which may include a master mold fabricated via photo-, e-beam, grayscale, 2-photon, or nanoimprint lithographic method; or a micro-contact printing method (μCP), for example. Replication technologies (e.g., nanoreplication) can include casting and curing a resin against a structured surface of a tool, for example. Suitable cast and cure methods, and suitable resins for use with such methods, are described U.S. Pat. No. 5,175,030 (Lu et al.) and U.S. Pat. No. 5,183,597 (Lu) and in U.S. Pat. Appl. Pub. No. 2012/0064296 (Walker, JR. et al.), for example. Other useful methods and/or materials for forming the etch resist layer are described in U.S. Pat. No. 8,658,248 (Anderson et al.); U.S. Pat. No. 5,811,183 (Shaw et al.); and U.S. Pat. No. 6,045,864 (Lyons et al.), for example. The structured tool may be fabricated using any suitable fabrication method, such as by photolithography or e-beam lithography to prepare a tooling master, a metal copy thereof, a polymer copy of either a tooling master or a metal copy thereof, a polymer copy of such a polymer copy, a directly written tool or any copy thereof, a copy of a structured liner or any copy thereof. Suitable fabrication methods are described in International Appl. Pub. No. WO 2009/002637 (Zhang et al.) and U.S. Pat. Appl. Pub. Nos. 2007/0065636 (Merrill et al.) and 2014/0193612 (Yu et al.); and U.S. Pat. No. 8,460,568 (David et al.), for example. The tool may be made via diamond turning for example. Exemplary diamond turning systems and methods are described in U.S. Pat. No. 7,350,442 (Ehnes et al.); U.S. Pat. No. 7,328,638 (Gardiner et al.), and U.S. Pat. No. 6,322,236 (Campbell et al.), for example. An example of patterning sub-wavelength gratings can be found in Chun-Wei Liu, Jiwang Yan, Shih-Chieh Lin, "Diamond turning of high-precision roll-to-roll imprinting molds for fabricating subwavelength gratings," Opt. Eng. 55(6), 064105 (2016), doi:10.1117/1. OE.55.6.064105.).:10.1117/1. OE.55.6.064105.).

The mask layer 131 can be made from any material having a suitable etch selectivity with the layer 110', 210', or 310'. In some embodiments, the mask layer 131 is or includes a metal or a silicon-containing metal oxide. Examples include chromium (Cr), aluminum (Al), copper (Cu), titanium (Ti), tungsten (W), germanium (Ge), iridium (Ir), platinum (Pt), ruthenium (Ru), osmium (Os), rhenium (Re), alloys thereof, or silicon-containing oxides thereof. In some embodiments, the mask layer 131 includes $SiO_2$, $Si_xO_yN_z$ (x=1, y=1~2, z=0~1), or $Si_xAl_yO_z$ (x=1, y=0~1, z=1~2). Useful oxides are described in U.S. Pat. Appl. Pub. No. 2015/0214405 (Nachtigal et al.), for example. Useful materials include titanium nitride (TiN), aluminum oxide ($Al_2O_3$), aluminum and chromium (Al/Cr) metal alloys, $Si_xC_yH_z$ (x=1, y=1~4, z=1~4), or $Si_xC_yN_zH_n$ (x=1, y=1~4, z=0~1, n=1~4), $Si_xN_y$ (x=1, y=0~1), $SiO_x$ (x=1~2), $SiH_x$ (x=1~4), for example. Other suitable materials include diamond-like glass as described in U.S. Pat. No. 8,034,452 (Padiyath et al.), for example. The mask layer 131 may also be referred to as a hard mask layer.

The etch stop layer 137 can be made from any material having a suitable etch selectivity with the layer 110', 210', or 310'. In some embodiments, the etch stop layer 137 is or includes a metal (e.g., Cr, Al, Ti, Zr, Ta, Hf, Nb, Ce, or alloys thereof), a metal oxide (e.g., oxides of any of these metals such as $Al_2O_3$ or $Si_xAl_yO_z$ (e.g., x=1, y=0~1, z=1~2); or $Si_xO_yN_z$ (e.g., x=1, y=1~2, z=0~1)), or a metal nitride (e.g., nitrides of any of these metals, or $Si_xO_yN_z$). In some embodiments, the etch stop layer 137 is or includes indium tin oxide, tin oxide, or alumina ($Al_2O_3$), for example. Useful materials include $Si_xC_yH_z$ (e.g., x=1, y=1~4, z=1~4), $Si_xC_yN_zH_n$ (e.g., x=1, y=1~4, z=0~1, n=1~4), $Si_xN_y$ (e.g., x=1, y=0~1), $SiO_x$ (e.g., x=1~2), $Si_xO_yN_z$ (e.g., x=1, y=1~2, z=0~1), or $SiH_x$ (e.g., x=1~4), for example. Other suitable materials include diamond-like glass, for example. In some embodiments, the etch stop layer 137 is be optically transparent, which can be understood to mean that the etch stop layer has an average optical transmittance for substantially normally incident light of at least 60% for a wavelength range of 400 nm to 700 nm.

The average thickness of the mask layer 131 and/or the etch stop layer 137 may range from about 1 nm to about 200 nm, or from about 2 nm to about 50 nm, or from about 2.5 nm to about 10 nm, for example. The mask layer 131 can have an average thickness less than 50 nm, or less than 25 nm, and/or greater than 5 nm, for example. The etch stop layer 137 can have an average thickness less than 25 nm and/or greater than 2 nm, for example.

The etch stop layer 137 may be selected from materials having a desired optical transmittance at a wavelength of interest for a suitable thickness. In some embodiments, the etch stop layer 137 has an optical transmittance for substantially normally incident light of at least 60%, or at least 70% for at least the first wavelength W1. In some embodiments, the structured layer is formed from one or more unstructured layers (e.g., any of the layers 110', 210', 310' may be a single layer may include multiple sublayers). In some embodiments, the one or more unstructured layers has an optical transmittance for substantially normally incident light of at least 60%, or at least 70% for at least the first wavelength W1.

FIG. 8 is a schematic cross-sectional view illustrating one or more unstructured layers 777, an incident light 773, and a transmitted light 774. The incident light 773 is substantially normally (e.g., within 20 degrees, or within 10 degrees, or within 5 degrees of normal) incident on the one or more unstructured layers 777 which can be a single layer (e.g., corresponding to any one of layers 131, 137, 110', 210', 310', or an unstructured layer formed of the material of any of layers 115, 215, or 315 and having a thickness of t1+t2) or can be a stack of layers (e.g., corresponding to layers 131, 137 and 110', 210', or 310'). The incident light 773 is schematically represented as having wavelength $\lambda$ in a range of $\lambda 1$ to $\lambda 2$. The range from $\lambda 1$ to $\lambda 2$ may be from 400 nm to 2500 nm, or 400 nm to 700 nm, or 700 nm to 2500 nm, for example. The wavelength $\lambda$ may be a single wavelength (e.g., the first wavelength W1) or a range of wavelengths (e.g., 400 nm to 700 nm). In some embodiments, the one or more unstructured layers 777 can have an optical transmittance of for substantially normally incident light of at least 60%, or at least 70%, or at least 80% for at least a first wavelength W1. In some embodiments, the one or more unstructured layers 777 can have an average optical transmittance (unweighted mean of optical transmittance over a given wavelength range) of for substantially normally incident light of at least 50%, or at least 60%, or at least 70%, or at least 80% for a wavelength range of 400 nm to 2500 nm or 400 nm to 700 nm, for example.

In some embodiments, a wafer master, (e.g., a semiconductor wafer substrate with a nanopattern etched into the wafer surface, usually silicon or silicon dioxide on silicon), is used in making a structured film that may be used to apply nanostructures to a waveguide plate, for example. The wafer master can be generated using standard mastering techniques such as e-beam lithography or immersion lithography, for example. The master pattern can then be copied into a series of process intermediates which may include a polymer copy (imprint resist on wafer), polymer stamp (imprint resist on polymer), a tiled polymer mother (tiled wafer patterns on a large glass substrate), an electroformed nickel shim, and a welded nickel sleeve. The welded nickel sleeve can used in a continuous cast and cure (e.g., nanoreplication) process, for example, to produce a structured film. The wafer pattern may be used in a single element layout or it may be composited with other patterns from other wafers to form a composite layout. Each may be carried through the process as a single element and then combined during a lamination step, or all but one, for example, can be composited at the tiled polymer mother step and made into a single composite film roll. The remaining element can then be laminated on the opposite side of the waveguide plate, for example, and not be composited with the other elements.

In some embodiments, a composite approach is utilized where individual nanopatterns are composited in an intermediate, such as the tiled polymer mother, which is used to fabricate a composite shim, sleeve, and film. A liner on the structured film may be laser kiss cut to reveal the adhesive in the structured regions (e.g., optical coupler regions) of the film and the whole film can be laminated to a waveguide plate. This route is useful if all couplers are on the same side of the waveguide plate, for example. In some embodiments, a single element approach is utilized where individual nanopatterns are carried through as single elements from wafer to film. In this case, the number of films can be the same as the number of wafers. Elements from each film can be prepared as described elsewhere herein and composited during lamination. In some embodiments, a combination of the composite and single element approaches are used where some, but not all, individual nanopatterns are applied on one side of the waveguide plate in the composite approach and the remaining individual nanopattern(s) are applied on the opposite side of the waveguide plate in the single element approach.

The laminated waveguide plate can be laser cut around the adhered coupler regions, for example, and the weed removed. In some embodiments, the resulting laminate represents the finished optical article. In other embodiments, the laminate is processed in further discrete steps to produce the finished optical article. In some embodiments, the waveguide may be singulated into a plurality of near-to-eye (NTE) augmented reality (AR) waveguides, for example.

EXAMPLES

A structured film article is prepared by using nanoreplication, solvent coating, plasma etching, vacuum thin film deposition, and lamination methods. The resultant construction is an optical article with a nanostructured optical functional layer (titanium dioxide) bonded to a receptor substrate such as a polished glass sheet.

These examples are merely for illustrative purposes only and are not meant to be limiting. All parts, percentages, ratios, etc. in the examples and the rest of the specification are by weight, unless noted otherwise. Solvents and other reagents used are obtained from Sigma-Aldrich Chemical Company, St. Louis, Missouri unless otherwise noted.

| Materials | | |
|---|---|---|
| Designation | Description | Source |
| PHOTOMER 6210 | Urethane acrylate oligomer available under the trade designation PHOTOMER 6210 | IGM Resins, Charlotte, NC, United States |
| SR238 | 1,6-hexanediol diacrylate available under the designation SR238 | Sartomer Americas, Exton, PA, United States |
| SR351 | Trimethylolpropane triacrylate available under the designation SR351 | Sartomer Americas, Exton, PA, United States |

-continued

Materials

| Designation | Description | Source |
|---|---|---|
| SR833 | tricyclodecane dimethanol diacrylate | Sartomer Americas, Exton, PA, United States |
| TPO | Diphenyl(2,4,6-trimethylbemzoy1)phosphine oxide available under the trade designation IRGACURE TPO | BASF, Florham Park, NJ, United States |
| HMDSO | Hexamethyldisiloxane | Gelest Inc., Morrisville, PA, United States |
| 90%/10% Si/Al | 90%/10% Si/Al sputtering target | Protech Materials, Hayward, CA, United States |
| Compound 01 | 2-(3-trimethoxysilylpropylcarbamoyloxy)ethyl prop-2-enoate assembled as described in Example 7 of U.S. Pat. No. 9,790,396 (Klun et al.) | 3M Company, St. Paul, MN, United States |
| FPI | Pentafluorobenzoyl methoxyphenylphosphine oxide prepared as described under Preparatory Example 5 | 3M Company, St. Paul, MN, United States |
| HFPO | Hexafluoropropyleneoxide dihydro diol diacrylate assembled as described in the Examples of U.S. Pat. No. 9,718,961 col. 16 lines 32-67 (Corveleyn et al.) | 3M Company, St. Paul, MN, United States |
| HFPO-FCA | Mixture of 8 parts HFPO and 1 part fluorinated coupling agent prepared as described under Preparatory Example 6 | 3M Company, St. Paul, MN, United States |
| HFPO-UA | Prepared according to Preparation No. 6., U.S. Pat. No. 7,718,264 (Klun et al.) column 25 lines 35-56 with the same starting materials in the same molar ratios, by a similar method, substituting acetone at 65% solids for methyl ethyl ketone at 50% solids | 3M Company, St. Paul, MN, United States |
| PGME | Propylene Glycol Methyl Ether | Brenntag Great Lakes, Wauwatosa, WI, United States |
| MEK | Methyl ethyl ketone | Brenntag Great Lakes, Wauwatosa, WI, United States |
| Cyclohexane | Cyclohexane ACS reagent grade (>99%) | Sigma-Aldrich Corporation, St. Louis, MO, United States |
| TPO-L | 2,4,6-trimethylbenzoylphenylphosphinic acid ethyl ester available under the trade designation IRGACURE TPO-L | BASF, Florham Park, NJ, United States |
| PF-5060 | Fully-fluorinated liquid ($C_6F_{14}$) available under the designation PF-5060 | 3M Company, St. Paul, MN, United States |
| $O_2$ | Oxygen (UHP compressed gas) | Oxygen Service Company, St. Paul, MN, United States |
| $N_2$ | Nitrogen (UHP compressed gas) | Oxygen Service Company, St. Paul, MN, United States |
| Ar | Argon (UHP compressed gas) | Oxygen Service Company, St. Paul, MN, United States |
| $CO_2$ | Carbon Dioxide (UHP compressed gas) | Oxygen Service Company, St. Paul, MN, United States |
| TTIP | Titanium tetra(isopropoxide) | Sigma-Aldrich Corporation, St. Louis, MO, United States |
| FG1901 G | A high molecular weight maleated styrene-butadiene-styrene available under the trade designation KRATON FG1901 G | Kraton Polymers LLC, Houston, TX, United States |
| ST504 | Polyester film available under the trade designation MELINEX ST504 | Du Pont Teijin Films, Chester, VA, United States |
| ST505 | Polyester film available under the trade designation MELINEX ST505 | Du Pont Teijin Films, Chester, VA, United States |
| Polycarbonate Film | 125-micrometer thick polycarbonate film with a gloss surface finish on both sides | Tekra, Inc., New Berlin, WI, United States |

-continued

Materials

| Designation | Description | Source |
|---|---|---|
| Glass wafer | 1.1 mm thick by 76.2 mm diameter glass wafers sold under the designation Eagle XG | Coresix Precision Glass, Inc., Williamsburg, VA, United States |

PREPARATORY EXAMPLES

Preparatory Example 1 (PE1)

An acrylate solution is prepared by first adding 75 wt % PHOTOMER 6210 with 25 wt % SR238 and 0.5% TPO to create a first acrylate mixture. 93 wt % of the first acrylate mixture is manually mixed with 7 wt % HFPO-UA resulting in a second acrylate mixture. The acrylate solution is then created by manually combining 14 wt % of the second acrylate mixture with 43 wt % PGME and 43 wt % MEK.

Preparatory Example 2 (PE2)

An adhesive promoter solution is prepared by adding 0.3 wt % of Compound 01 with 99.7 wt % MEK and 0.003 wt % TPO-L.

Preparatory Example 3 (Resin D)

An acrylate resin mixture prepared by combining and mixing PHOTOMER 6210, SR238, SR351 and TPO in weight ratios of 60/20/20/0.5.

Preparatory Example 4 (Substrate 01)

A substrate with a release layer is made by coating a releasable layer on ST505 film on a roll to roll vacuum coater similar to the coater described in U.S. Patent Application No. 20100316852 (Condo, et al.) with the addition of a second evaporator and curing system located between the plasma pretreatment station and the first sputtering system, and using evaporators as described in U.S. Pat. No. 8,658, 248 (Anderson and Ramos).

The ST505 film is prepared for coating by subjecting it to a nitrogen plasma treatment to improve the adhesion of the metallic layer. The film is treated with a nitrogen plasma operating at 120 W using a titanium cathode, using a web speed of 9.8 meters/min and maintaining the backside of the film in contact with a coating drum chilled to 0° C.

On the prepared ST505 substrate, a release layer of 90%/10% Si/Al is deposited in-line with the previous plasma treatment step. A conventional AC sputtering process employing Ar gas and operating at 16 kW of power is used to deposit a 7 nm thick layer of SiAl alloy onto the substrate. The SiAl coated PET substrate is then rewound.

An acrylate transfer layer, SR833 with less than 1 wt % Compound 1 is applied to the release layer by ultrasonic atomization and flash evaporation. The flow of liquid monomer into the evaporator is 0.67 mL/minute. The nitrogen gas flow rate is 100 standard cubic centimeters per minute (SCCM) and the evaporator temperature is set at 500° F. (260° C.). The process drum temperature is 14° F. (−10° C.). The monomeric coating is subsequently cured immediately downstream with an electron beam curing gun operating at 7.0 kV and 10.0 mA to result in a 180 nm acrylate thickness.

Preparatory Example 5 (FPI)

Pentafluorobenzoyl methoxyphenylphosphine oxide is synthesized under yellow ambient light under vacuum in a flame-dried 3-neck roundbottom flask fitted with thermocouple, magnetic stir bar, and liquid addition funnel. The roundbottom flask is back-filled with dry nitrogen and charged with 9.92 g (58.3 mmol) dimethoxyphenylphosphine.

The liquid addition funnel is charged with 13.44 g (58.3 mmol) pentafluorobenzoyl chloride, and the reaction apparatus is connected to vacuum. The roundbottom flask is cooled with a dry ice/isopropanol bath and the pentafluorobenzoyl chloride is added dropwise at a rate sufficient to keep the reaction temperature under 15° C. During this time the reaction mixture becomes a bright yellowish-orange pourable-viscosity oil. Pentafluorobenzoyl methoxyphenylphosphine oxide is collected in quantitative yield and stored in a brown glass jar.

Preparatory Example 6 (HFPO-FCA)

To a 500 mL roundbottom flask equipped with stithar and septum under nitrogen is added 120 g (0.0663 mol, 1810 MW) of HFPO Oligomer Diacrylate (Mn=2000 g/mol, prepared according to the synthetic method generally described in U.S. Pat. No. 9,718,961 (Corveleyn et al.)) and 120 g of 1,1,1-trifluorotoluene which is previously dried as a 50% solids solution over 4 Angstrom molecular sieves in a septum capped bottle. Next, 1.42 g (1.46 ml, 0.007366 mol, 193.32 number average MW) N-methyl-3-aminopropyltrimethoxysilane is added and the reaction was stirred at room temperature (RT) for 2 h, at which time an aliquot is evaluated by 1H Fourier transform nuclear magnetic resonance spectroscopy (FT-NMR) in D8-tetrahydrofuran/Freon 113. The reaction is then concentrated on a rotary evaporator at 2 torr at 57° C. for about 30 min and bottled under nitrogen.

Prophetic Example 1

An optical article is prepared using the following process:
Step 1. Nanoreplication of Template Layer A nanostructure tooling film is prepared by die coating Resin D onto a polycarbonate film. The coated film is pressed against a nanostructured nickel surface attached to a steel roller controlled at 60° C. using a rubber covered roller at a speed of 15.2 meters/min. The nanostructured nickel surface consists of twelve 6 mm by 6 mm patterned areas with features ranging in size between 75 nm and 500 nm. The patterned area consists of a multi-pitch pattern with pitches of 150, 200, and 250 nm with feature widths of half the pitch (75, 100, 125 nm).

The features are arranged in a square grid so that pitches are varied in both axes resulting in a nine unit repeating cell with rectangles of all combinations of widths mentioned above. In this repeating cell, the 150 nm pitch sections have 27 features, the 200 nm pitch sections have 20 features and the 250 nm pitch sections have 16 features. The features are about 200 nm tall and have side wall angles of approximately 4 degrees.

The coating thickness of Resin D on the film is sufficient to fully wet the nickel surface and form a rolling bead of resin as the coated film is pressed against the nanostructured nickel surface. The film is exposed to radiation from two Fusion UV lamp systems (obtained under the trade designation "F600" from Fusion UV Systems, Gaithersburg, MD) fitted with D bulbs both operating at 142 W/cm while in contact with the nanostructured nickel surface. After peeling the film from the nanostructured nickel surface, the nanostructured side of the film is exposed again to radiation from the Fusion UV lamp system.

Step 2: Release Treatment

A silicon containing release film layer assembled according to methods described in U.S. Pat. No. 6,696,157 (David et al.) and U.S. Pat. No. 8,664,323 (Iyer et al.) and U.S. Patent Application Publication No. 2013/0229378 (Iyer et al.) is applied to the nanostructure tooling film in a parallel plate capacitively coupled plasma reactor. The chamber has a central cylindrical powered electrode with a surface area of 1.7 m$^2$ (18.3 ft$^2$).

The nanostructured tooling film is placed on the powered electrode, and the reactor chamber is pumped down to a base pressure of less than 1.3 Pa (2 mTorr). O$_2$ gas is flowed into the chamber at a rate of 1000 SCCM. Treatment is carried out using a plasma enhanced CVD method by coupling radiofrequency (RF) power into the reactor at a frequency of 13.56 MHz and an applied power of 2000 Watts. Treatment time is controlled by moving the nanostructure tooling film through the reaction zone at rate of 9.1 meter/min (30 ft/min) resulting in an approximate exposure time of 10 seconds. After completing the deposition, RF power is turned off and gasses are evacuated from the reactor.

After the first treatment, a second plasma treatment is carried out in the same reactor without returning the chamber to atmospheric pressure. HMDSO gas is flowed into the chamber at approximately 1750 SCCM to achieve a pressure of 9 mTorr. 13.56 MHz RF power is subsequently coupled into the reactor with an applied power of 1000 W. The film is then carried through the reaction zone at a rate of 9.1 meter/min (30 ft/min) resulting in an approximate exposure time of 10 seconds. At the end of this treatment time, the RF power and the gas supply are stopped, the chamber is returned to atmospheric pressure, and the release-treated nanostructure tooling film is removed from the chamber.

Step 3: Pattern Transfer Film

A pattern transfer film is made by depositing etch stop and pattern transfer layers onto an 11.5-inch-wide ST505 PET substrate film by reactive sputtering and organic vapor deposition in a system similar to that described in U.S. Pat. No. 5,440,446 (Shaw et al.) and U.S. Pat. No. 7,018,713 (Padiyath, et al.). The substrate film is coated in roll-to-toll (R2R) format. In a first pass through this system, the substrate film is treated with a nitrogen plasma from an unbalanced dc magnetron cathode with titanium target at 50 W power and a nitrogen flowrate of 100 SCCM.

Immediately after plasma treatment the film, a base etch-stop layer of about 12 nm of a SiAlO$_x$ is sputter-deposited atop the plasma-treated surface. An alternating current (AC) 40 kHz power supply is used to control a pair of rotating cathodes; with each cathode housing a 90%/10% Si/Al sputtering target (obtained from Soleras Advanced Coatings ETS, of Biddeford, ME). During sputter deposition, the voltage signal from the power supply is used as an input for a proportional-integral-differential control loop to maintain a predetermined oxygen flow to each cathode. The sputtering conditions are: AC power 16 kW, line speed 9.75 meters/min (32 ft/min), with a gas mixture containing 350 SCCM argon and 223 SCCM oxygen at a sputter pressure of 2.6 mTorr.

The SiAlO$_x$ surface is then vapor coated with a layer of 90% HFPO-FCA/9% HFPO/1% FPI (wt %) approximately 100 nm thick using an organic vapor deposition system and method described in U.S. Pat. No. 8,658,248 (Anderson, et al.). A line speed of 3.81 meters/min (12.5 ft/min) is held while maintaining the backside of the film in contact with a coating drum chilled to 0° C. The monomer is degassed under vacuum to a pressure of 20 mTorr prior to coating. This liquid is pumped into an ultrasonic atomizer at a liquid flowrate of 1.0 ml/min using a syringe pump, and a nitrogen gas flowrate of 10 SCCM is input to the atomizer. The liquid is flash evaporated at 250° C. and delivered to the SiAlO$_x$ surface. The vapor stream condenses onto the film surface and is cured by UV irradiation using a low-pressure mercury arc lamp.

A top etch-stop layer of approximately 12 nm thick SiAlO$_x$ is deposited onto the HFPO-FCA/HFPO/FPI surface using the same method as described for the base etch-stop layer.

Step 4: Adhesion Promoter

An adhesion promoter solution of PE2 was coated onto the pattern transfer film created in Step 3 using slot die coating. The solution is pumped using a Harvard syringe pump at 3 SCCM through a slot die onto the film, which is moving at a rate of 6 meters/minute. The film then moves through a 65° C. oven for 1.5 minutes after which it is cured using a Fusion H bulb and subsequently wound up.

Step 5: Resist Transfer

The release treated nanostructure tooling film from step 2 is slot-die coated with acrylate solution PE1 at 3 meters/minute. The solution is coated 10.16 cm wide and pumped with a Harvard syringe pump at a rate of 1.05 SCCM. The coating is partially cured 1.5 meters from the solution application using a 405 nm UV-LED system powered at 0.2 Amps at 40 volts. The coating experiences approximately 0.005 W/cm$^2$ irradiance in the UV-Visible spectrum.

The film is then dried at ambient conditions for 3 minutes before entering a nip. At the nip, the pattern transfer film (with the base etch-stop, transfer layer, top etch-stop, and adhesion promoter) from Step 4 is laminated with the PE1-coated release-treated template film.

The nip consists of a 90-durometer rubber roll and a steel roll set at 37° C. The nip is engaged by two Bimba air cylinders pressed by 0.28 MPa.

The coated PE1 acrylate solution is cured using a Fusion H bulb and the first acrylate mixture is separated from the release treated template film leaving behind the cured PE1 coating on the transfer film for the entirety of the 6 mm by 6 mm patterned areas. Web tensions are set to be approximately 0.0057 N/m.

Step 6: Etching the Transfer Layer

An etched pattern transfer film is made by etching the patterned transfer film from Step 5 according the Method for Reactive Ion Etching.

Reactive ion etching is performed on the patterned film in the same reactor chamber used to deposit the release treatment layer in Step 2. After placing the patterned transfer film on the powered electrode, the reactor chamber is pumped down to a base pressure of less than 1.3 Pa (1 mTorr). A mixture of PF-5060 and oxygen gas is flowed into the chamber at a rate of 100 SCCM and 50 SCCM, respectively. 13.56 MHz RF power is subsequently coupled into the reactor with an applied power of 7500 W. The film is then transported through the reaction zone at a rate of 1.2 meter/min (4 ft/min), to achieve an exposure time of about 75 s in order to transfer the pattern into the top etch-stop layer.

When the first etch step is complete, the RF power is turned off and gasses are evacuated from the reactor. Following the first etch, a second reactive ion etching treatment is carried out in the same reactor without returning the chamber to atmospheric pressure. Oxygen gas is flowed into the chamber at a flow rate of 275 SCCM. 13.56 MHz RF power is subsequently coupled into the reactor with an applied power of 7500 W.

The patterned transfer film is then carried through the reaction zone at a rate of 7.6 meter/min (25 ft/min) resulting in an approximate exposure time of 12 seconds. At the end of this treatment time, the RF power and the gas supply are stopped, and the chamber is returned to atmospheric pressure.

Additional information regarding materials and processes for continuous reactive ion etching through a nanostructured mask and further details around the reactor can be found in U.S. Pat. No. 8,460,568 (David et al.).

Step 7: $TiO_2$ Backfill

A backfilled nanostructured film is formed by depositing $TiO_2$ in the etched pattern transfer film from Step 6. The $TiO_2$ backfill layer is formed from titanium tetra(isopropoxide) (TTIP) precursor using a spatial atomic layer deposition (ALD) process. The planar coating is performed in a spatial R2R ALD machine as described by PCT Patent Publication No. 2017/172531 (Lyons et al.). $TiO_2$ is deposited using TTIP heated to 80° C. with 300 SCCM $N_2$ push gas, and a plasma discharge (approximately 0.50 mA/cm2) in an environment of 1.1 torr $N_2$ and 0.3 torr $CO_2$. The ALD chamber is heated to 100° C.

The film is translated through the ALD chamber for a plurality of passes at 30.48 meters/min (100 ft/min), with one precursor exposure and one plasma exposure per ALD cycle, and 72 ALD cycles per chamber pass. The film is translated through the ALD chamber 10-50 passes to yield a $TiO_2$ layer thick enough to fill the etched nanostructures in the transfer film and form a planar surface over the top of the nanostructured areas of the transfer film.

Step 8: Solution Coating of Adhesive Layer

An adhesive layer is formed on the surface of the $TiO_2$ backfilled nanostructured film from Step 7 by slot die coating an adhesive coating solution in a roll-to-roll process. The adhesive coating solution is made by diluting a quantity of FG1901 G in sufficient cyclohexane to produce a solution containing 0.33% wt. total solids. The solution is coated onto the film from Step 5 at a speed and flow rate to produce a wet coating thickness of about 9 micrometers. The coated web travels approximately 2.4 m (8 ft) before entering a 9.1 m (30 ft) conventional air floatation drier with all 3 zones set at 80° C. (176° F.). After drying, the adhesive coating thickness is about 30 nanometers.

Step 9: Laminate to Glass Substrate

An optical article is formed by laminating the adhesive-coated nanostructured film from Step 8 to a glass substrate. A suitable glass substrate is 1.1 mm thick, 76.2 mm diameter Eagle XG glass wafer with a surface roughness of less than 1 nm RMS. The film is laminated to the glass substrate by placing the adhesive side of the structured film on one surface of the glass wafer and passing them through an HL-100 Hot Roll Laminator (ChemInstruments, West Chester Township, OH) set to 80 psi, 40 cm/min, and 115° C.

Prophetic Example 2

Steps 1-7 are completed as in Prophetic Example 1.
Step 7a: Thinning $TiO_2$ Backfill The $TiO_2$ backfilled nanostructured film constructed in Step 7 is reactive ion etched to reduce the thickness of the planarized ALD $TiO_2$ layer. Reactive ion etching is performed on the film in the same reactor chamber used to deposit the release treatment layer in Prophetic Example 1 Step 2. After placing the patterned transfer film on the powered electrode, the reactor chamber is pumped down to a base pressure of less than 1.3 Pa (1 mTorr). Nitrogen trifluoride gas is flowed into the chamber at a rate of 1000 SCCM. 13.56 MHz RF power is subsequently coupled into the reactor with an applied power of 7500 W. The film is then transported through the reaction zone to achieve planar removal rate of 100 nm/min of exposure time. The exposure time is chosen to leave a thin planar layer of TiO2 on the nanostructured film such that the residual layer is less than 50 nm thick.

Steps 8 and 9 are repeated as in Prophetic Example 1.

Prophetic Example 3

An optical article is prepared as described in Prophetic Example 1 or Prophetic Example 2 with the exception that in Step 1, the nanostructure tooling film is prepared on Substrate 01 rather than polycarbonate.

After step 9, the 90%/10% Si/Al layer of Substrate 01 is weakened by exposing it to UV light through the ST505 film. After UV exposure, the ST505 substrate is removed by peeling the substrate away from the structure thereby leaving the structure attached to the glass wafer.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations, or variations, or combinations of the specific embodiments discussed herein. Therefore, it is intended that this disclosure be limited only by the claims and the equivalents thereof.

What is claimed is:

1. An optical article, comprising
a waveguide; and
a structured film, comprising:
  a polymeric substrate;
  an etch stop layer disposed on the polymeric substrate;
  a structured layer comprising a plurality of engineered structures disposed on a side of the etch stop layer opposite the polymeric substrate;
  a planarizing backfill layer disposed over the plurality of engineered structures to define a substantially planar major surface of the planarizing backfill layer having a surface roughness Ra, a difference in index of refraction of the planarizing backfill layer and the structured layer being at least 0.25 for at least a first wavelength W1 in a range of 400 nm to 2500 nm; and
  an adhesive layer disposed on the substantially planar major surface of the planarizing backfill layer and bonding the structured film to the waveguide, the adhesive layer having an average thickness ta, Ra<ta<¼ W1.

2. The optical article of claim 1, wherein the structured film further comprises an unstructured layer disposed between the etch stop layer and the polymeric substrate, a difference in index of refraction of the planarizing backfill layer and the unstructured layer being at least 0.2 for at least the first wavelength W1.

3. The optical article of claim 1, wherein the engineered structures are slanted relative to the etch stop layer.

4. The optical article of claim 1 further comprising a dynamic separating layer disposed between the etch stop layer and the polymeric substrate.

5. The optical article of claim 1, wherein the average thickness ta is less than 250 nm.

6. The optical article of claim 1, wherein the average thickness ta is less than 100 nm.

7. The optical article of claim 1, wherein the plurality of engineered structures comprises a plurality of nanostructures.

8. The optical article of claim 1, wherein the surface roughness Ra is less than 20 nm.

9. A structured film, comprising:
  a polymeric substrate;
  an etch stop layer disposed on the polymeric substrate;
  a structured layer comprising a plurality of engineered structures disposed on a side of the etch stop layer opposite the polymeric substrate, the engineered structures being slanted relative to the etch stop layer;
  a planarizing backfill layer disposed over the plurality of engineered structures to define a substantially planar major surface of the planarizing backfill layer having a surface roughness Ra, a difference in index of refraction of the planarizing backfill layer and the structured layer being at least 0.25 for at least a first wavelength W1 in a range of 400 nm to 2500 nm; and
  an adhesive layer having an average thickness ta disposed on the substantially planar major surface of the planarizing backfill layer, Ra<ta<¼ W1.

10. The structured film of claim 9, wherein each engineered structure in at least a majority of the engineered structures comprises a sidewall defining an exterior angle with the etch stop layer in a range of 45 to 85 degrees.

11. The structured film of claim 9, wherein the structured layer comprises a fluoropolymer and the planarizing backfill layer comprises a metal oxide, nitride or oxynitride.

12. The structured film of claim 9, wherein the first wavelength W1 in a range of 400 nm to 700 nm.

13. The structured film of claim 9 comprising a dynamic separating layer disposed between the polymeric substrate and the etch stop layer, wherein the dynamic separating layer is adapted to facilitate separation of the polymeric substrate and the etch stop layer upon activation.

14. The structured film of claim 13, wherein the dynamic separating layer is adapted to release from the etch stop layer upon activation.

15. The structured film of claim 9, wherein the surface roughness Ra is less than 20 nm.

* * * * *